United States Patent [19]
Hackett et al.

[11] Patent Number: 5,240,358
[45] Date of Patent: Aug. 31, 1993

[54] METHOD AND APPARATUS FOR TOOL BALANCING

[75] Inventors: Brian K. Hackett, Saline; Wayne L. Winzenz, Manchester, both of Mich.; Jack H. Kerlin, Springville, Utah

[73] Assignee: Balance Dynamics Corporation, Ann Arbor, Mich.

[21] Appl. No.: 618,711

[22] Filed: Nov. 27, 1990

[51] Int. Cl.⁵ .................. B23C 9/00; B23Q 15/18
[52] U.S. Cl. ...................... 409/141; 51/169; 73/468; 74/573 R; 82/904; 464/180
[58] Field of Search ............ 409/141, 231, 232, 233, 409/234, 131; 82/904; 408/17; 51/169; 74/573 R; 73/468, 470; 364/463; 464/180

[56] References Cited

U.S. PATENT DOCUMENTS

| | | |
|---|---|---|
| 861,463 | 7/1907 | Hyde ...................... 74/573 |
| 3,376,759 | 4/1968 | Held ...................... 74/573 |
| 4,977,510 | 12/1990 | Winzenz et al. ............ 364/463 |

FOREIGN PATENT DOCUMENTS

| | | |
|---|---|---|
| 3013704 | 12/1981 | Fed. Rep. of Germany ........ 73/468 |
| 0050283 | 4/1977 | Japan ...................... 73/468 |
| 0004567 | 1/1987 | Japan ...................... 51/169 |
| 0138844 | 5/1990 | Japan ...................... 74/573 R |

Primary Examiner—Z. R. Bilinsky
Attorney, Agent, or Firm—Dykema Gossett

[57] ABSTRACT

A method and apparatus for balancing tools 16 is disclosed which may uniquely characterize a needed balance for each of the individual tools 16 and which may then store the needed balance conditions so as to use the balancing data upon every use of the individual tool 16. This balance is achieved, in one embodiment, by the movement of certain balancing objects 28 from a balance containment member 22 to cavities 26 within a balance reception member 24. Should the original balance condition falter, the apparatus and methodology of this invention allow the balance conditions to be updated, dynamically, and to be stored for later use.

11 Claims, 10 Drawing Sheets

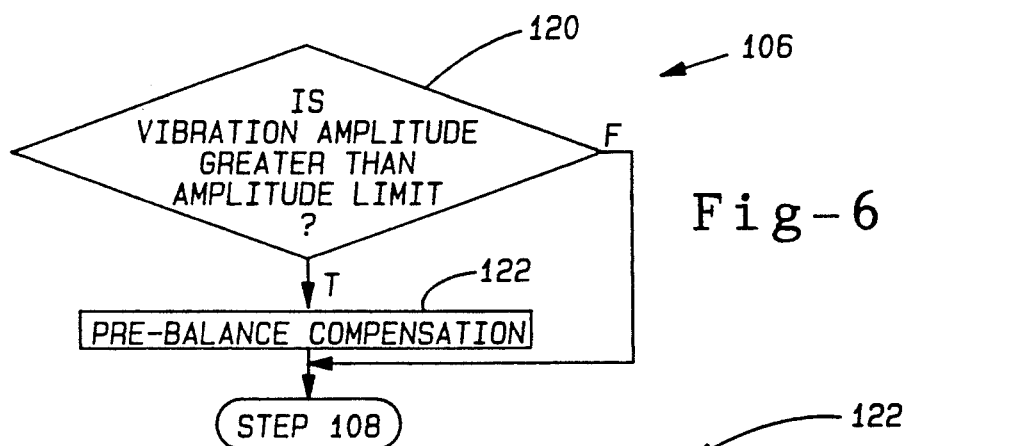
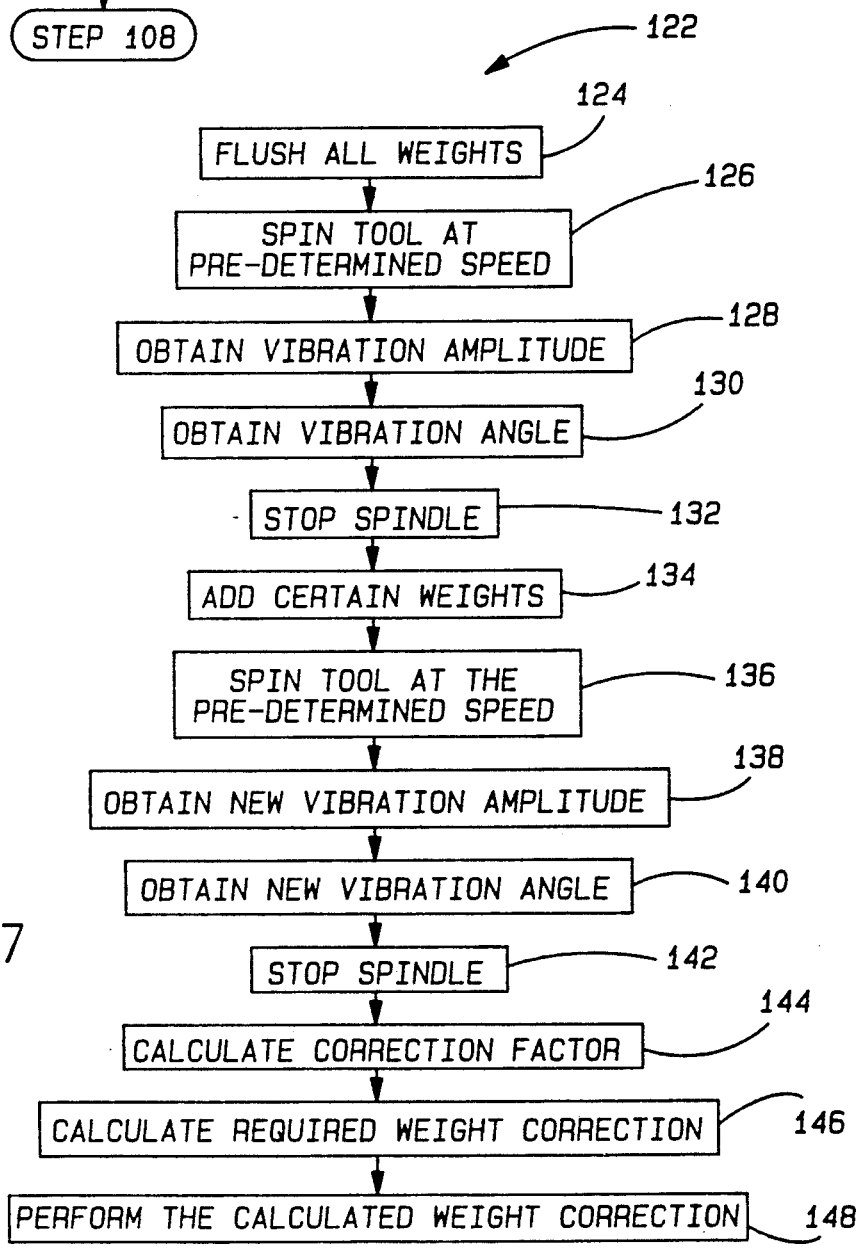

METHOD AND APPARATUS FOR TOOL BALANCING

BACKGROUND OF THE INVENTION

1. Field of the Invention

This invention relates to a method and to an apparatus for balancing a tool and more particularly to a method and an apparatus for distributing weighted objects in spatial relation to the tool in order to balance the tool.

2. Discussion

Machine tools are used in a wide variety of manufacturing applications requiring highly precise cutting, milling, boring, shaping, drilling, or other sorts of activities. Normally a variety of unique tools and associated tool holders are placed into a automated tool magazine and then are automatically placed, as needed, into an operative position by means of a tool changer operating under stored program control. The operative tool, so chosen, is run or activated at a relatively high speed for a pre-determined amount of time necessary for the chosen tool to perform its desired operation. In fact, such tool operational speeds may exceed 10,000 rotations per minute (rpm) and may include tool accelerations and decelerations of approximately 2,000–5,000 rpms per second.

While these tools have been very successful in performing their needed and highly precise functions, they have also experienced difficulties in meeting or maintaining these highly precise standards, over a period of time, due to imbalances. These imbalances arise from such things as normal wear of the tool, wear associated with the tool holding apparatus into which the tool resides and or is coupled, design of the tool holding apparatus, and manufacturing technologies employed to make the tool holding apparatus. Typical levels of imbalance usually approach approximately 60 gram millimeters.

In order to consistently maintain the high quality of the goods manufactured by means of these high-speed tools, it is necessary to correct for these imbalances by performing a balancing operation upon the tool. Such a balancing operation must, however, occur very quickly and with a high degree of repeatability because of the high speed of the tools used and because of the repeated use of the same tools. If a manual balance were accomplished, much time would be wasted from the desired manufacturing activities resulting in a waste of resources and a lack of productivity.

While there currently exists a number of balancers, these balancers have been found to inadequately balance such high-speed machine tools. For instance, a "waterwheel" balancer is generally not capable of operating at such high speeds since air being carried by the balancer prevents the water stream from properly being directed into the appropriate chamber. In fact, even if the water stream was properly directed into the chamber, the high rotational speed of the tool would tend to atomize the water stream as it hit the chamber wall, resulting in an incorrect balance. Additionally, the waterwheel has been found to be much too slow to achieve the desired tool balance and is not capable of repeating a previous balance condition for a specific tool, resulting in increased time necessary to once again achieve a previously known and now needed balance state.

In contrast, the "counterbalance" balancer is faster than the waterwheel as it requires simply a motor and a plurality of gears to appropriately position weights in variable positions, wherein a specific weight and the position of that specific weight are selected by "trial and error." While the counterbalance balancer is relatively fast, it becomes inoperative at the relatively high tool speeds since the gears and other associated structural components tend to fail at these speeds. Additionally, this "trial and error" approach provides a balancing operation which is still considered to be slow and fails to offer the desired ability to repeat known prior balance states, when these previously known and/or derived balance states are needed again. Such a failure to repeat these balance states results in additional time spent in unnecessary "trial and error" activities. The counterbalance balancer is therefore considered to be inappropriate for use with such high speed tools as are the other known types of balancers.

SUMMARY OF THE INVENTION

It is therefore a primary object of this invention to provide a method and an apparatus for tool balancing which is capable of quickly balancing high speed tools.

It is another object of this invention to provide a method and apparatus for tool balancing which allows a tool to be balanced, at a speed which may be substantially equal to the normal operating speed of the tool.

It is yet a further object of this invention to provide a method and an apparatus for tool balancing which balances a tool and which automatically applies substantially the same balance condition to the tool, when the tool is used again.

It is another object of this invention to provide a method and an apparatus for tool balancing which balances a tool by the placement of certain weighted objects in certain object receptacles wherein, the receptacles are distributed in a certain spatial relation to the tool to be balanced.

It is yet another object of this invention to provide a tool balancing apparatus which is operatively placed upon the tool spindle and which provides means to compensate for the imbalance of both the spindle itself and the imbalance caused by the tool balancing apparatus.

It is another object of this invention to provide a method and an apparatus for tool balancing which corrects even very small levels of imbalance but which is also capable of correcting relatively large imbalances as well.

It is yet another object of this invention to provide means for determining the spatial relationship of a plurality of weighted objects around a tool in order to achieve a desired balance condition and to provide means to store this spatial relationship in electronic memory.

It is a further object of this invention to initially determine the balance condition effectuated by a plurality of different placements of weighted objects around a tool and to use this initial determination in selecting one of these plurality of different placements at a later time, in response to a measured level of vibration.

According to the teachings of the present invention, a tool balancer may be provided which has measurement means for measuring an amount of vibration associated with the tool and which further has balancing means, coupled to the measurement means and responsive to the measured amount of vibration, for placing an object at a pre-selected position from said tool, the one pre-selected position being chosen by use of the measured amount of vibration.

Further objects, features and advantages of the invention will become apparent from consideration of the following description and the appended claims when taken in conjunction with the accompanying drawings.

BRIEF DESCRIPTION OF THE DRAWINGS

Various advantages of the present invention will become apparent to those skilled in the art by reading the following specification and by reference to the following drawings in which:

FIG. 6 is a flow chart illustrating the sequence of steps comprising the "Check Compensator balance" routine shown generally in FIG. 5;

FIG. 7 is a flow chart illustrating the sequence of steps comprising the "Pre-Balance Compensator" routine shown generally in FIG. 6;

DETAILED DESCRIPTION OF THE INVENTION

This detailed description of the invention is segmented into the following sectional explanatory areas:
(I). TOOL BALANCER ARCHITECTURAL OVERVIEW
(II). TOOL BALANCER CONTROL SYSTEM
 A. HARDWARE
 B. SOFTWARE OPERATION
(III). EPILOGUE

(I). BALANCER ARCHITECTURAL OVERVIEW

Before discussing the preferred embodiment of this invention it will be necessary to discuss the overall balancing scheme and the reasoning behind this scheme so that a fuller appreciation of this invention may be achieved. In order to achieve relatively fast and repeatable tool imbalance correction it was found to be beneficial to develop and implement an apparatus and an associated methodology represented in part by a stored computer program, which was capable of distributing various weighted objects, in spatial relation to the tool, to correct for this measured imbalance. Each distribution which was to be utilized was to have a unique and previously calculated amount of correction and/or a direction of correction associated therewith. The amount and direction of correction may be thought of as a correction "vector." The correction amounts associated with each of these distributions needed to be previously found in order that these previously found amounts and directions may be employed on an "as needed" basis in order that a relatively wasteful "trial and error" technique or methodology could be avoided. Furthermore, these weighted objects had to be capable of being quickly moved into a desired spatial position with respect to the tool to be balanced, and then, just as quickly, retracted or removed when the correction was either changed or no longer needed.

The balancer architecture, of the preferred embodiment of this invention, also needed an apparatus (i.e. an electronic memory) for storing the needed balance condition, represented by the distribution pattern of the weighted objects, for every tool that had been previously balanced, in order that a prior balanced state may be readily used again, when a particular tool was now needed. These architectural requisites allowed the balancer, of this invention, to represent an improvement in both balancing speed and accuracy over the past "trial and error" techniques which took a relatively long period of time to achieve the desired balance condition. This set of requisite balancer requirements directly affected the architecture or hardware configuration of the tool balancer of the preferred embodiment of this invention. To begin to understand the balancer of the preferred embodiment of this invention, reference is now made to FIGS. 1, 2, and 3(a-b).

Figure 1:
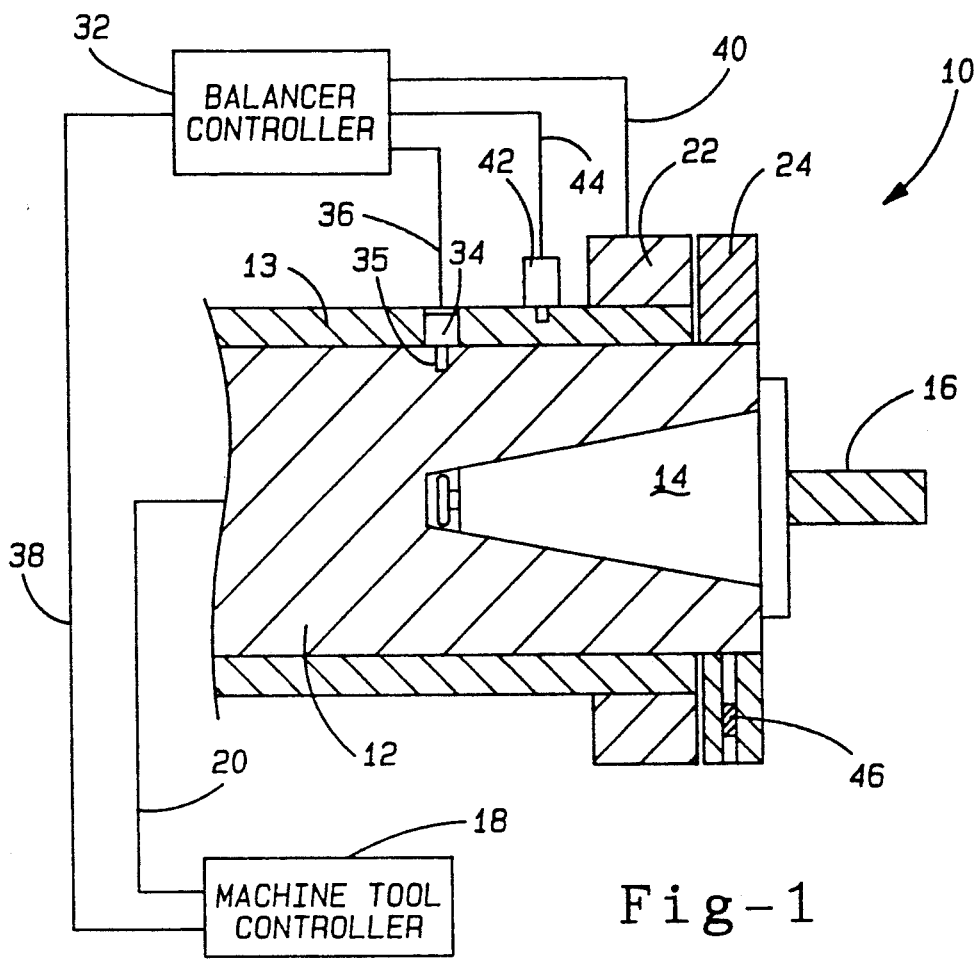
FIG. 1 is a partial cut-away side view of the tool balancer of the preferred embodiment of this invention as used and deployed in conjunction with a high speed tool.

Specifically, as shown in FIG. 1, it is seen that the tool balancer 10, of the preferred embodiment of this invention comprises a balancer controller 32 and members 22 and 24. Members 22 and 24 of the preferred embodiment of this invention, are shaped in the general form of a ring in order to securely fit over the spindle 12 or spindle housing 13 respectively. A tool holder 14 is securely coupled within spindle 12. It should be understood, by those of ordinary skill in the art, that balancer 10 (i.e. members 24 and 22) may however assume virtually any geometric shape desired by a user of the balancer 10 in order to have members 22 and 24 fit over virtually any desired spindle 12 or spindle housing 13 having virtually any desired shape. A tool 16 is normally securely placed within holder 14 such that spindle 12, tool holder 14, and tool 16 rotate or move uniformly in response to data commands from the machine tool controller host 18 through bus 20. Host 18 may typically comprise a machine numerical controller, such as the "Model 86000" produced by the Allen-Bradley Company of Milwaukee, Wis.

Figure 2:
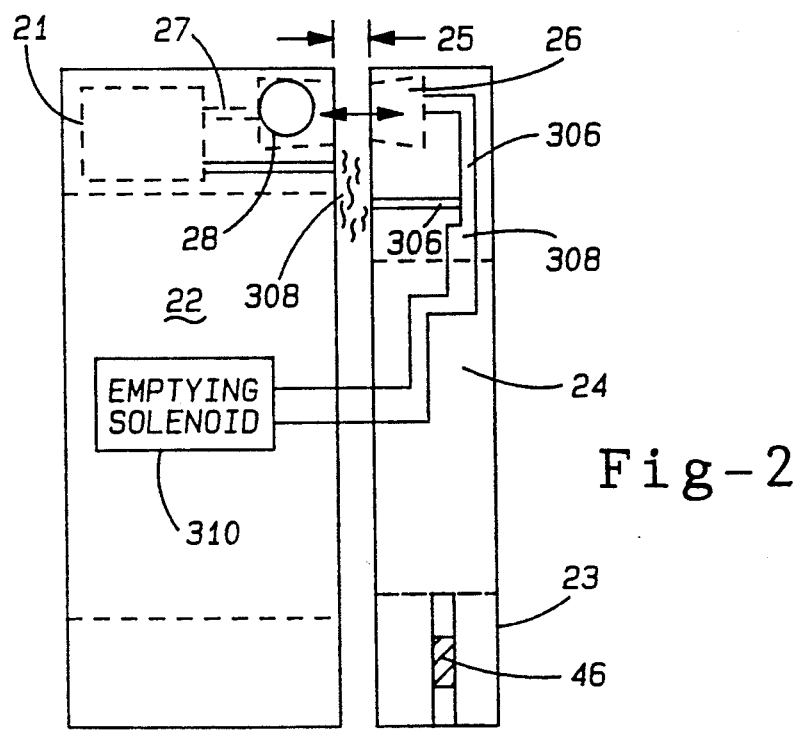
FIG. 2 is a partial cut-away side view of the tool balancer shown generally in FIG. 1 and illustrating the movement of a balancing object, made in accordance with the teachings of the preferred embodiment of this invention, to correct for tool imbalance.

In order to effectively provide known and discrete quantities of balance correction, the balancer 10 was designed, in the preferred embodiment of this invention, to have a first object containment member 22, which is secured to the spindle housing 13, and a second object reception member 24, which is secured to the spindle 12, as best shown in FIGS. 1 and 2 and 3(a-b). Both members 22 and 24 are designed to have substantially the same ringed shape and are separated by spatial distance 25.

Figure 3A:
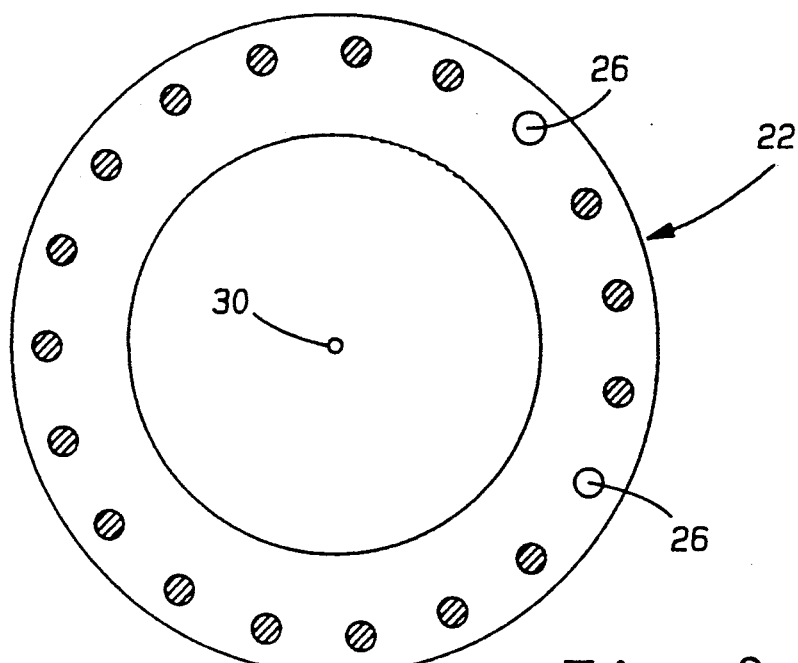
FIGS. 3(a-b) respectively, are plan views of an object provider member and an object reception member, made in accordance with the teachings of the preferred embodiment of this invention and, which are both associated with the tool balancer shown generally in FIGS. 1 and 2.
Figure 3B:
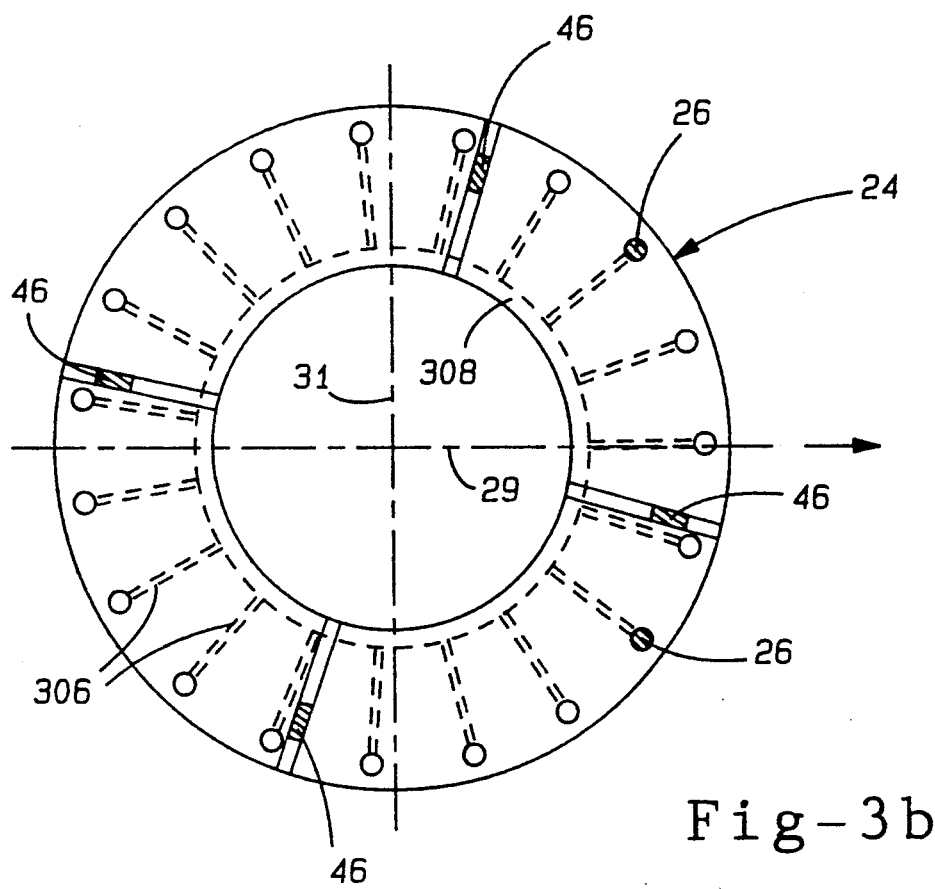

As shown best in FIGS. 3(a) and 3(b), members 22 and 24 are each designed to have object holding cavities or "pockets" 26 which are all of substantially the same shape but slightly larger in size than the balancing object 28. In the preferred embodiment of this invention objects 28 are spheres, but in fact, these objects 28 be virtually any geometric shape desired. The only constraint being that the objects 28 be capable of being received into pockets 26. Therefore, the geometric configurations of the objects 28 and the pockets 26 should be substantially similar and these configurations are interelated for this reason.

The cavities 26 are circumferentially placed upon the members 22 and 24 such that all of the cavities or pockets 26 are substantially equidistant from the center of the member 22 or 24, that they are positioned thereon. Each cavity 26, upon the member 22, has a single cavity 26, upon member 24, uniquely associated with it and spaced a spatial distance 25 from it. Specifically, member 22, in this one preferred embodiment, is made to initially contain substantially identical balancing objects 28 such that every cavity 26, of the member 22, initially has a single one of the substantially identical weighted balancing objects 28 therein. As earlier stated, the objects 28 may be of virtually any size and shape, the only restriction being that they somewhat fit within or are capable of being received by each of the cavities 26. In this first, and preferred embodiment of the invention, the objects 26 are chrome surfaced steel balls.

The distributed placement or transmission of certain of the objects 28 within selected cavities 26 of the reception member 24, from member 22 provides for a plurality of different and unique balance states. Each of these unique balance states has a different balancing effect upon the spindle 12 which, as shown best in FIG. 1, contains the tool 16 and tool holder 14. Therefore, each of these different balance states produces a unique balance of the tool 16. It should be noted that while it is possible that two (or more) different distributions of the objects 28, upon member 24, may result in substantially identical balancing effects, this phenomenon is not present, in the preferred embodiment of this invention, since only those distributions giving unique balancing effects are used or employed by this invention.

The selection of the weights of each of the objects 28 is also critical to the overall balancing scheme of the preferred embodiment of the invention. That is, it was found that the larger the weight of any one object 28 (in the preferred embodiment of the invention all of the objects 28 have substantially the same weight), the greater was the total correction capacity of the balancer 10. That is, the use of relatively heavier objects 28 allowed the balancer 10 to correct for greater levels of imbalance. This was due to the fact that a relatively heavy overall weight distribution could be produced, by the distributed placement of the relatively heavy objects 28 within member 24, to counteract a large imbalance. However, as the weight of each of the objects 28 increased, it was found that a concomitant increase in the coarseness of the correction was developed since each heavier object 28 provided a greater incremental amount of correction than was needed in all cases. For instance, by using relatively "heavy" objects 28, it may not be possible to produce only a slight amount of correction and the possibility of "over correction" results, thus adding to the imbalance condition. For this reason the weight of the objects 28, used in the preferred embodiment of this invention is approximately 0.26 grams at a distance 33 (see FIG. 17), equal to approximately 160 mm, from the center of one of the pockets 26 to the center of rotation 30 of the member 22 (or 24). With this object weight, it was found to be possible to provide a relatively small amount of correction, when needed, while having an upper threshold total correction capacity to be relatively large and to be used in situations where the amount of imbalance is large. Generally, it should be realized by one of ordinary skill in the art that the optimal weight of the objects 28 will vary depending upon the length of distance 33 and the total correction capacity desired.

The results of the calculated deployment of different weighted objects 28 within the balancer of the preferred embodiment of this invention are set forth in Table 1 below. It should be noted that these calculations are based upon the use of nineteen of the pockets 26, which is the pocket configuration used in the preferred embodiment of this invention and which will be explained hereinlater:

TABLE 1

| Balancer Radius To Center Of Rotation (mm) (Distance 33) | Balancing Object Diameter (mm) | Coarsest Correction | Capacity Capacity |
| --- | --- | --- | --- |
| 120 | 3.0 | 0.3162 gm mm | 45.53 gm mm |
| 130 | 3.0 | 0.3426 gm mm | 49.33 gm mm |
| 140 | 3.0 | 0.3690 gm mm | 53.12 gm mm |
| 150 | 3.0 | 0.3952 gm mm | 56.92 gm mm |
| 160 | 3.0 | 0.4217 gm mm | 60.71 gm mm |
| 170 | 3.0 | 0.4480 gm mm | 64.51 gm mm |
| 180 | 3.0 | 0.4744 gm mm | 68.30 gm mm |
| 190 | 3.0 | 0.5007 gm mm | 72.10 gm mm |
| 200 | 3.0 | 0.5271 gm mm | 75.89 gm mm |
| 210 | 3.0 | 0.5534 gm mm | 79.68 gm mm |
| 120 | 4.0 | 0.7496 gm mm | 107.93 gm mm |
| 130 | 4.0 | 0.8121 gm mm | 116.93 gm mm |
| 140 | 4.0 | 0.8745 gm mm | 125.92 gm mm |
| 150 | 4.0 | 0.9370 gm mm | 134.91 gm mm |
| 160 | 4.0 | 0.9995 gm mm | 143.91 gm mm |
| 170 | 4.0 | 1.0620 gm mm | 152.90 gm mm |
| 180 | 4.0 | 1.1244 gm mm | 161.90 gm mm |
| 190 | 4.0 | 1.1869 gm mm | 170.89 gm mm |
| 200 | 4.0 | 1.2494 gm mm | 179.89 gm mm |
| 130 | 5.0 | 1.5861 gm mm | 228.37 gm mm |
| 140 | 5.0 | 1.7081 gm mm | 245.94 gm mm |
| 150 | 5.0 | 1.8301 gm mm | 263.51 gm mm |

TABLE 1-continued

| Balancer Radius To Center Of Rotation (mm) (Distance 33) | Balancing Object Diameter (mm) | Coarsest Correction | Capacity Capacity |
| --- | --- | --- | --- |
| 160 | 5.0 | 1.9521 gm mm | 281.07 gm mm |
| 170 | 5.0 | 2.0741 gm mm | 298.64 gm mm |
| 180 | 5.0 | 2.1961 gm mm | 316.21 gm mm |
| 190 | 5.0 | 2.3181 gm mm | 333.77 gm mm |
| 200 | 5.0 | 2.4401 gm mm | 351.34 gm mm |
| 140 | 6.0 | 2.9516 gm mm | 424.98 gm mm |
| 150 | 6.0 | 3.1624 gm mm | 455.34 gm mm |
| 160 | 6.0 | 3.3733 gm mm | 485.69 gm mm |
| 170 | 6.0 | 3.5841 gm mm | 516.05 gm mm |
| 180 | 6.0 | 3.7949 gm mm | 546.40 gm mm |
| 190 | 6.0 | 4.0057 gm mm | 576.76 gm mm |
| 200 | 6.0 | 4.2166 gm mm | 607.12 gm mm |
| 120 | 3.5 | 0.5022 gm mm | 72.31 gm mm |
| 130 | 3.5 | 0.5440 gm mm | 78.33 gm mm |
| 140 | 3.5 | 0.5859 gm mm | 84.36 gm mm |
| 150 | 3.5 | 0.6277 gm mm | 90.38 gm mm |
| 160 | 3.5 | 0.6696 gm mm | 96.41 gm mm |
| 170 | 3.5 | 0.7114 gm mm | 102.43 gm mm |
| 180 | 3.5 | 0.7533 gm mm | 108.46 gm mm |
| 190 | 3.5 | 0.7951 gm mm | 114.48 gm mm |
| 200 | 3.5 | 0.8370 gm mm | 120.51 gm mm |
| 210 | 3.5 | 0.8788 gm mm | 126.53 gm mm |
| 120 | 4.5 | 1.0673 gm mm | 153.68 gm mm |
| 130 | 4.5 | 1.1563 gm mm | 166.48 gm mm |
| 140 | 4.5 | 1.2452 gm mm | 179.29 gm mm |
| 150 | 4.5 | 1.3342 gm mm | 192.10 gm mm |
| 160 | 4.5 | 1.4231 gm mm | 204.90 gm mm |
| 170 | 4.5 | 1.5120 gm mm | 217.71 gm mm |
| 180 | 4.5 | 1.6010 gm mm | 230.51 gm mm |
| 190 | 4.5 | 1.6899 gm mm | 243.32 gm mm |
| 200 | 4.5 | 1.7789 gm mm | 256.13 gm mm |
| 130 | 5.5 | 2.1111 gm mm | 303.96 gm mm |
| 140 | 5.5 | 2.2735 gm mm | 327.34 gm mm |
| 150 | 5.5 | 2.4359 gm mm | 350.73 gm mm |
| 160 | 5.5 | 2.5983 gm mm | 374.11 gm mm |
| 170 | 5.5 | 2.7607 gm mm | 397.49 gm mm |
| 180 | 5.5 | 2.9230 gm mm | 420.87 gm mm |
| 190 | 5.5 | 3.0854 gm mm | 444.25 gm mm |
| 200 | 5.5 | 3.2478 gm mm | 467.63 gm mm |

*Where the weight of the above diameters of the balancing objects uniquely correspond to the following weight:

| DIAMETER (mm) | WEIGHT (gms) |
| --- | --- |
| 3.0 | 0.110266 |
| 3.5 | 0.175098 |
| 4.0 | 0.261371 |
| 4.5 | 0.372148 |
| 5.0 | 0.510491 |
| 5.5 | 0.679463 |
| 6.0 | 0.882128 |

**Where the Coarset Correction = MAX (Increment of correction as found in Table 3) × (weight of balancing object) × (Distance 33) and where Functional Capacity =

$$MAX \left[ \frac{\text{correction amount}}{\text{MAX (Increment of corrections as Found in Table 3)}} \right] \times (\text{Coarset correction}).$$

It was also found that the greater the amount of cavities 26 that were employed within members 22 or 24, (i.e., in the preferred embodiment of this invention both members 22 and 24 have the same number of cavities 26) the greater was the total balancing capacity (i.e. more cavities 26 allowed for the use of more objects 28 thereby allowing for more different and larger balance corrections) and the finer was the balance change attributable to any one of this large number of cavities 26.

However, it was also found that a large number of cavities 26 resulted in an increase in the overall mechanical complexity of the tool balancer 10 with a concomitant increase in the overall expense of the balancer 10. This expense increase was due in part, to the increase of electronic memory needed to store the balance corrections associated with each of the unique balance patterns defined by the placement of the various objects 28 within the increased number of cavities 26.

It was also found that using a prime number of cavities 26, within members 22 and 24, provides the maximum number of balance correction possibilities, since, with a prime number of cavities 26, there aren't any equal offset (from the vertical center line 31 (see FIG. 3(b)) of any two pairs of the cavities 26, thereby reducing the number of different object distributions giving the same balance correction. Finally, it was also found that the use of an odd number of pockets or cavities 26 made it possible to perform balance corrections having a correction vector associated therewith which passed substantially midway between any two of the cavities 26 or directly through a selected cavity 26. This correction vector 29 (see FIG. 17) defines the amount and the direction of the balance correction achieved by proper placement of the objects 28 within certain of the cavities 26.

In this preferred embodiment of the invention (in part, for the reasons set forth above), a total of nineteen cavities are employed. That is, nineteen is both an odd and a prime number and therefore the number of correction vectors 29 is not reduced by offset and these vectors 29 may be directed either between two cavities 26 or through a single cavity 26. Further, using nineteen cavities 26, a radius 33 of 160 mm, and an object diameter of 4 mm, a correction capacity results which is approximately one hundred forty-four times the coarsest correction results (see Table 1). This appears to be a reasonable correction range since the unbalanced tool 16 and tool holder 14 typically have approximately 60 gram millimeters of imbalance and it is desired to normally decrease this imbalance to approximately 2 gram millimeters of imbalance. Therefore, the capacity of the nineteen cavity balancer is well within this range when using the aforementioned balance object type and radius.

Figure 17:
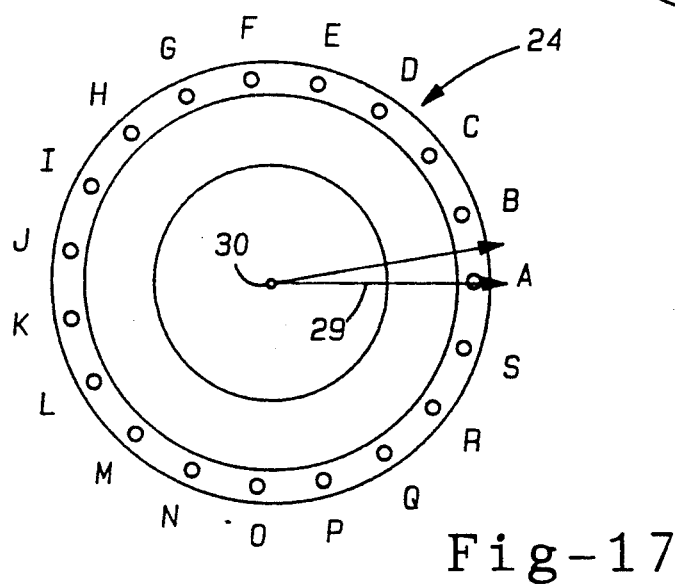
FIG. 17 is a plan view of the tool balancer shown generally in FIGS. 1, 2, and 3 and illustrating the two correction planes used by the preferred embodiment of this invention.

While nineteen cavities have been selected, it was next necessary to decide what set of possible balance correction distributions would be utilized in the preferred embodiment of this invention. That is, for nineteen cavities 26, it was found that there exists over five hundred thousand possible unique placement or distributions of objects 26 (i.e., approximately $2^{19}-1$). In order to simplify the overall design of the tool balancer 10 while still maintaining needed balancing capabilities, the balancer 10, of this preferred embodiment of the invention, utilizes only those correction placements of objects 28 which give balance corrections which have vector directions (referred to as "correction planes" 29) which emanate from the center of rotation 30 (see FIGS. 3(a), 17) and either pass through a point in close proximity a cavity 26 (i.e. within 0.5° of cavity 26) or through a point which lies substantially in the middle of two of the cavities 26 (i.e. within 0.5° of the middle). A middle point between any two cavities 26 is at approximately 9.47° from each of the adjacent cavities 26. This is illustrated in FIG. 17 and as can be seen, each of the nineteen cavities 26, in FIG. 17, are sequentially denoted as "A" through "S".

In general, Table 2 below defines a representative set of the correction planes used by the balancer 10 of this preferred embodiment of the invention. As shown, each of the referenced pocket combinations produce a correction amount which is simply the product of the correction factor, the total weight of the balancing objects 28 which are used, and distance 33 (FIG. 17) which represents the distance of any one of the pockets 26 from the center of rotation 30.

TABLE 2

0° Angle Offset
(Correction Plane Passing Through a Pocket 26)

| Pocket Combination | Angle From Plane "A" | Angle Cosine | Relative *TOTAL Weight | Correction Factor |
|---|---|---|---|---|
| A | 0.0000 | 1.0000 | 1.000 | 1.0000 |
| B and S | 18.9474 | 0.9458 | 2.000 | 1.8916 |
| C and R | 37.8947 | 0.7891 | 2.000 | 1.5783 |
| D and Q | 56.8421 | 0.5469 | 2.000 | 1.0939 |
| E and P | 75.7895 | 0.2455 | 2.000 | 0.4910 |
| F and O | 94.7368 | −0.0826 | 2.000 | −0.1652 |
| G and N | 113.6842 | −0.4017 | 2.000 | −0.8034 |
| H and M | 132.6316 | −0.6773 | 2.000 | −1.3546 |
| I and L | 151.5789 | −0.8795 | 2.000 | −1.7589 |
| J and K | 170.5263 | −0.9864 | 2.000 | −1.9727 |

9.47° Angle Offset
(Correction Plane Passing Between Two Pockets 26)

| Pocket Combination | Angle From Plane "A" | Angle Cosine | *TOTAL Weight | Correction Factor |
|---|---|---|---|---|
| A and B | 9.4737 | 0.9864 | 2.000 | 1.9727 |
| C and S | 28.4211 | 0.8795 | 2.000 | 1.7589 |
| D and R | 47.3684 | 0.6773 | 2.000 | 1.3546 |
| E and Q | 66.3158 | 0.4017 | 2.000 | 0.8034 |
| F and P | 85.2632 | 0.0826 | 2.000 | 0.1652 |
| G and O | 104.2105 | −0.2455 | 2.000 | −0.4910 |
| H and N | 123.1579 | −0.5469 | 2.000 | −1.0939 |
| I and M | 142.1053 | −0.7891 | 2.000 | −1.5783 |
| J and L | 161.0526 | −0.9458 | 2.000 | −1.8916 |
| K | 180.0000 | −1.0000 | 1.000 | −1.0000 |

*Where relative total weight column entries are found by dividing by the weight of one of the objects 28 by the total weight used for the correction.

Specifically, only the pockets or cavities which are listed under "pocket combination" are made to contain an object 28. The correction factors may be readily calculated, by one of ordinary skill in the art, by the use of the law of cosines. Additionally, the other table entries associated with the other correction planes have substantially similar and repeating correction factor patterns, although having different correction plane corrections. For example, the correction factor associated with the pocket combination DEHMPQ is simply $(1/56.84°)+(1/75.79°)+(1/132.63°)+(1/227.37°)+(1/1284.21°)+(1/303.61°)$ which equals $(0.547+j0.837)+(0.245+j0.969)+(-0.677+j0.736)+(-0.677-j0.736)+(2.45-j0.969)+(0.547-j0.837)$ which equals to 0.230/0°.

Table 3 below lists further representative correction amounts for various combinations of object placements within pockets 28 whose configuration is shown in FIG. 17 (Please note that it is assumed that each of these combinations utilizes the same distance 33 and weight of objects 28).

TABLE 3

| Pocket Combination | Correction Angle | Correction Amount | Increment |
|---|---|---|---|
| ACGILNR | 0.0000 | 0.0159 | 0.0159 |
| ADEGILNPQ | 0.0000 | 0.0225 | 0.0066 |
| BCDGIJKLNQRS | −0.0000 | 0.0288 | 0.0063 |
| AFGNO | 0.0000 | 0.0315 | 0.0027 |
| ACDEGHJKMNPQR | 0.0000 | 0.0325 | 0.0010 |
| BCEGHILMNPRS | 0.0000 | 0.0440 | 0.0115 |
| BDFGKNOQS | 0.0000 | 0.0443 | 0.0003 |
| CDEHILMPQR | 0.0000 | 0.0496 | 0.0053 |
| ABEHJKMPS | 0.0000 | 0.0553 | 0.0057 |
| CFHMOR | 0.0000 | 0.0586 | 0.0033 |
| BEFGHMNOPS | 0.0000 | 0.0595 | 0.0009 |
| BCEFIJKLOPRS | 0.0000 | 0.0641 | 0.0046 |
| DEFHMOPQ | 0.0000 | 0.0651 | 0.0010 |
| ABDGHILMNQS | 0.0000 | 0.0686 | 0.0035 |
| ACDEFGHILMNOPQ | 0.0000 | 0.0811 | 0.0125 |
| ABDFIJKLOQS | 0.0000 | 0.0887 | 0.0076 |
| CEJKPR | 0.0000 | 0.0965 | 0.0078 |
| ABEFHILMOPS | 0.0000 | 0.1039 | 0.0074 |
| CDGILNQR | 0.0000 | 0.1098 | 0.0059 |
| EFGJNPQ | −0.3533 | 0.1114 | 0.0016 |
| BDEGKNOP | 0.3533 | 0.1114 | 0.0000 |
| ABGJKNS | 0.0000 | 0.1155 | 0.0041 |
| ADJKQ | 0.0000 | 0.1212 | 0.0057 |
| DFGNOQ | 0.0000 | 0.1253 | 0.0041 |
| ACEFGJKNOPR | 0.0000 | 0.1280 | 0.0027 |
| BILS | 0.0000 | 0.1327 | 0.0047 |
| AEHMP | 0.0000 | 0.1364 | 0.0037 |
| BCHJKMRS | 0.0000 | 0.1426 | 0.0062 |
| CEFILOPR | 0.0000 | 0.1451 | 0.0025 |
| BDEHJKMPQS | 0.0000 | 0.1492 | 0.0041 |
| AEFIJLPQS | −0.2525 | 0.1558 | 0.0066 |
| ABDEIKLOP | 0.2525 | 0.1558 | 0.0000 |
| ABFGILNOS | 0.0000 | 0.1641 | 0.0083 |
| ABCDEGHIJKLMNP | 0.0000 | 0.1652 | 0.0011 |
| ADFILOQ | 0.0000 | 0.1698 | 0.0046 |
| ABCFGHJKMNORS | 0.0000 | 0.1741 | 0.0043 |
| BEGIJNORS | −0.2808 | 0.1745 | 0.0004 |
| BCFGKLNPS | 0.2808 | 0.1745 | 0.0000 |
| ACDFHJKMOQR | 0.0000 | 0.1797 | 0.0052 |
| DEIJOQR | −0.2720 | 0.1801 | 0.0004 |
| CDFKLPQ | 0.2720 | 0.1801 | 0.0000 |
| ABDEFGHJKMNOP | 0.0000 | 0.1807 | 0.0006 |
| BCFHILMORS | 0.0000 | 0.1912 | 0.0105 |
| AGN | 0.0000 | 0.1966 | 0.0054 |
| BDEFHILMOPQS | 0.0000 | 0.1978 | 0.0012 |
| BDGJKNQS | 0.0000 | 0.2094 | 0.0116 |
| CDEFGJKNOPQR | 0.0000 | 0.2219 | 0.0125 |
| CHMR | 0.0000 | 0.2237 | 0.0018 |
| BEGHMNPS | 0.0000 | 0.2247 | 0.0010 |
| BCEIJKLPRS | 0.0000 | 0.2292 | 0.0045 |
| DEHMPQ | 0.0000 | 0.2303 | 0.0011 |
| CFIJLQRS | −0.1618 | 0.2432 | 0.0129 |
| BCDIKLOR | 0.1618 | 0.2432 | 0.0000 |
| DFHINPQS | −0.3795 | 0.2442 | 0.0010 |
| BDEGLMOQ | 0.3795 | 0.2442 | 0.0000 |
| BEFJKOPS | 0.0000 | 0.2447 | 0.0005 |
| ACDEGHILMNPQR | 0.0000 | 0.2462 | 0.0015 |
| ABDIJKLQS | 0.0000 | 0.2539 | 0.0077 |
| ACDGJLMOS | −0.2720 | 0.2545 | 0.0006 |
| ABFHIKNQR | 0.2720 | 0.2545 | 0.0000 |
| ACFGHMNOR | 0.0000 | 0.2552 | 0.0007 |
| ABDEFKLMNQ | −0.3011 | 0.2578 | 0.0026 |
| ADGHIJOPQS | 0.3011 | 0.2578 | 0.0000 |
| BDFGILNOQS | 0.0000 | 0.2580 | 0.0002 |
| ABCEFGIJKLNOPRS | 0.0000 | 0.2607 | 0.0027 |
| ADEFGHMNOPQ | 0.0000 | 0.2618 | 0.0011 |
| ACDEFIJKLOPQR | 0.0000 | 0.2663 | 0.0045 |
| BCDFGHJKMNOQR | 0.0000 | 0.2680 | 0.0017 |
| ABEHILMPS | 0.0000 | 0.2691 | 0.0011 |
| DGNQ | 0.0000 | 0.2905 | 0.0214 |
| ACEGJKNPR | 0.0000 | 0.2931 | 0.0026 |
| CEILPR | 0.0000 | 0.3103 | 0.0172 |
| ABCDFHIJKLMOQR | 0.0000 | 0.3124 | 0.0021 |
| EFOP | 0.0000 | 0.3258 | 0.0134 |
| ABGILNS | 0.0000 | 0.3293 | 0.0035 |
| ADILQ | 0.0000 | 0.3349 | 0.0056 |
| CEFGHJMNPQRS | −0.1174 | 0.3351 | 0.0002 |
| BCDEGHKMNOPR | 0.1174 | 0.3351 | 0.0000 |
| ABCGHJKMNRS | 0.0000 | 0.3392 | 0.0041 |
| BFHLPR | −0.4287 | 0.3411 | 0.0019 |

TABLE 3-continued

| Pocket Combination | Correction Angle | Correction Amount | Increment |
|---|---|---|---|
| CEIMOS | 0.4287 | 0.3411 | 0.0000 |
| ACEFGILNOPR | 0.0000 | 0.3418 | 0.0007 |
| ACDHJKMQR | 0.0000 | 0.3449 | 0.0031 |
| ABDEGHJKMNPQS | 0.0000 | 0.3458 | 0.0009 |
| CDFGHMNOQR | 0.0000 | 0.3491 | 0.0033 |
| BCDEFGIJKLNOPQ | 0.0000 | 0.3546 | 0.0055 |
| BCHILMRS | 0.0000 | 0.3564 | 0.0018 |
| BDEHILMPQS | 0.0000 | 0.3630 | 0.0066 |
| BFHMOS | 0.0000 | 0.3719 | 0.0089 |
| ADEGIJNOQR | −0.1300 | 0.3767 | 0.0048 |
| ACDFGKLNPQ | 0.1300 | 0.3767 | 0.0000 |
| ACEFHIJLMPQRS | −0.1037 | 0.3796 | 0.0029 |
| ABCDEHIKLMOPR | 0.1037 | 0.3796 | 0.0000 |
| CDEGJKNPQR | 0.0000 | 0.3870 | 0.0074 |
| ABCFGHILMNORS | 0.0000 | 0.3879 | 0.0009 |
| ACDFHILMOQR | 0.0000 | 0.3935 | 0.0056 |
| ABDEFGHILMNOPQ | 0.0000 | 0.3944 | 0.0009 |
| BEJKPS | 0.0000 | 0.4099 | 0.0155 |
| ACGHMNR | 0.0000 | 0.4203 | 0.0104 |
| BDGILNQS | 0.0000 | 0.4232 | 0.0029 |
| ABDFGHJLNOPR | 9.4737 | 0.0159 | 0.0159 |
| ABDFIJLMPR | 9.4737 | 0.0225 | 0.0066 |
| DFGKOPR | 9.4737 | 0.0288 | 0.0063 |
| ABCDGHIJLMNORS | 9.4737 | 0.0315 | 0.0027 |
| CFJLPS | 9.4737 | 0.0325 | 0.0010 |
| ABFHKNP | 9.4737 | 0.0440 | 0.0115 |
| CDGIKMORS | 9.4737 | 0.0443 | 0.0003 |
| ABEFJKLPQ | 9.4737 | 0.0496 | 0.0053 |
| CEFHIMNPQS | 9.4737 | 0.0553 | 0.0057 |
| ABCEGHJKLNOQS | 9.4737 | 0.0586 | 0.0033 |
| ABCHIKMNS | 9.4737 | 0.0595 | 0.0009 |
| DEHKNQR | 9.4737 | 0.0641 | 0.0046 |
| ABCEIJKLMQS | 9.4737 | 0.0651 | 0.0010 |
| ABFGIMOP | 9.4737 | 0.0686 | 0.0035 |
| ABJL | 9.4737 | 0.0811 | 0.0125 |
| DEGIMOQR | 9.4737 | 0.0887 | 0.0076 |
| CDEFHJKLNPQRS | 9.4737 | 0.0965 | 0.0078 |
| ABEHIMNQ | 9.4737 | 0.1039 | 0.0074 |
| ABDFGJKLOPR | 9.4737 | 0.1098 | 0.0059 |
| ABCEHJKLMQR | 9.1203 | 0.1114 | 0.0016 |
| ACDHIJKMPRS | 9.8269 | 0.1114 | 0.0000 |
| CDFGHIMNOPRS | 9.4737 | 0.1155 | 0.0041 |
| CDEFGIJLMOPQRS | 9.4737 | 0.1212 | 0.0057 |
| ABCDGIJKLMORS | 9.4737 | 0.1253 | 0.0041 |
| CDHJLNRS | 9.4737 | 0.1280 | 0.0027 |
| ABDEFGHIKMNOPQ | 9.4737 | 0.1327 | 0.0047 |
| ABCEFHIJLMNPQS | 9.4737 | 0.1364 | 0.0037 |
| CEFGHKNOPQS | 9.4737 | 0.1426 | 0.0062 |
| ABDEHJKLNQR | 9.4737 | 0.1451 | 0.0025 |
| CEFIKMPQS | 9.4737 | 0.1492 | 0.0041 |
| ACDEHKMNPQ | 9.2212 | 0.1558 | 0.0066 |
| ADEHIJMPQR | 9.7262 | 0.1558 | 0.0000 |
| ABDGHIMNOR | 9.4737 | 0.1641 | 0.0083 |
| FP | 9.4737 | 0.1652 | 0.0011 |
| ABDEGIJLMOQR | 9.4737 | 0.1698 | 0.0046 |
| CGHNOS | 9.4737 | 0.1741 | 0.0043 |
| ABCFGJLMOQ | 9.1929 | 0.1745 | 0.0004 |
| ADFHIKNORS | 9.7545 | 0.1745 | 0.0000 |
| CEGJLOQS | 9.4737 | 0.1797 | 0.0052 |
| ABCDFIJKLOPQ | 9.2017 | 0.1801 | 0.0004 |
| ADEFIJKLOQRS | 9.7457 | 0.1801 | 0.0000 |
| CIMS | 9.4737 | 0.1807 | 0.0006 |
| ABEGHKNOQ | 9.4737 | 0.1912 | 0.0105 |
| ABCDFGHIJLMNOP | 9.4737 | 0.1966 | 0.0054 |
| ABEIKMQ | 9.4737 | 0.1978 | 0.0012 |
| CDFGIKMOPRS | 9.4737 | 0.2094 | 0.0116 |
| CDJKLRS | 9.4737 | 0.2219 | 0.0125 |
| ABCEFGHJKLNOPQ | 9.4737 | 0.2237 | 0.0018 |
| ABCFHIKMNPS | 9.4737 | 0.2247 | 0.0010 |
| DEFHKNPQR | 9.4737 | 0.2292 | 0.0045 |
| ABCEFIJKLMPQS | 9.4737 | 0.2303 | 0.0011 |
| ACDEFJKMNPQ | 9.3119 | 0.2432 | 0.0129 |
| ADEGHJKOPQR | 9.6355 | 0.2432 | 0.0000 |
| ADFHIJLOQRS | 8.3352 | 0.2442 | 0.0010 |
| ABCDFIKLMOQ | 9.0942 | 0.2442 | 0.0000 |
| CDEHIKMNQRS | 9.4737 | 0.2447 | 0.0005 |
| ABFJLP | 9.4737 | 0.2462 | 0.0015 |
| DEFGIMOPQR | 9.4737 | 0.2539 | 0.0077 |
| ADFGHKNOQR | 9.2017 | 0.2545 | 0.0006 |
| ACDFGJMNOQ | 9.7457 | 0.2545 | 0.0000 |
| ABCGHJLNOS | 9.4737 | 0.2552 | 0.0007 |
| AFGIJMQRS | 9.1726 | 0.2578 | 0.0026 |
| ABCDHKLNO | 9.7748 | 0.2578 | 0.0000 |
| ABDGIKMOR | 9.4737 | 0.2580 | 0.0002 |
| ACDHJLOQ | 9.2692 | 0.2607 | 0.0027 |
| ABCIJLMS | 9.4737 | 0.2618 | 0.0011 |
| DEJLQR | 9.4737 | 0.2663 | 0.0045 |
| CGKOS | 9.4737 | 0.2680 | 0.0017 |
| ABEFHIMNPQ | 9.4737 | 0.2691 | 0.0011 |
| ABCDFGIJKLMOPRS | 9.4737 | 0.2905 | 0.0214 |
| CDFHJLNPRS | 9.4737 | 0.2931 | 0.0026 |
| ABDEFHJKLNPQR | 9.4737 | 0.3103 | 0.0172 |
| EGOQ | 9.4737 | 0.3124 | 0.0021 |
| ABCDEHIJKLMNQR | 9.4737 | 0.3258 | 0.0134 |
| ABDFGHIMNOPR | 9.4737 | 0.3293 | 0.0035 |
| ABDEFGILMOPQR | 9.4737 | 0.3349 | 0.0056 |
| ABEJKMR | 9.3563 | 0.3351 | 0.0002 |
| ACHJKPS | 9.5911 | 0.3351 | 0.0000 |
| CFGHNOPS | 9.4737 | 0.3392 | 0.0041 |
| ACDEGIJLMNPRS | 9.0450 | 0.3411 | 0.0019 |
| ABCEGHIKLNPQR | 9.9024 | 0.3411 | 0.0000 |
| ABDHJLNR | 9.4737 | 0.3418 | 0.0007 |
| CEFGJLOPQS | 9.4737 | 0.3449 | 0.0031 |
| CFIMPS | 9.4737 | 0.3458 | 0.0009 |
| ABCGJKLOS | 9.4737 | 0.3491 | 0.0033 |
| DKR | 9.4737 | 0.3546 | 0.0055 |
| ABEFGHKNOPQ | 9.4737 | 0.3564 | 0.0018 |
| ABEFIKMPQ | 9.4737 | 0.3630 | 0.0066 |
| ABCEGHIKMNOQS | 9.4737 | 0.3719 | 0.0089 |
| ABCFIKLOQ | 9.3437 | 0.3767 | 0.0048 |
| ADFIJLORS | 9.6037 | 0.3767 | 0.0000 |
| ADEKMP | 9.3700 | 0.3796 | 0.0029 |
| AEHJPQ | 9.5774 | 0.3796 | 0.0000 |
| CDFJKLPRS | 9.4737 | 0.3870 | 0.0074 |
| ABGHNO | 9.4737 | 0.3879 | 0.0009 |
| ABEGJLOQ | 9.4737 | 0.3935 | 0.0056 |
| ABIM | 9.4737 | 0.3944 | 0.0009 |
| CEDFHIKMNPQRS | 9.4737 | 0.4099 | 0.0155 |
| ABCFGHJLNOPS | 9.4737 | 0.4203 | 0.0104 |
| ABDFGIKMOPR | 9.4737 | 0.4232 | 0.0029 |

Therefore, we now have known correction amounts produced by a known distribution of objects 28 upon member 22 and, with this information, one could simply choose a needed distribution depending upon a known imbalance situation occurring at the tool 16 or tool holder 14. By remembering or storing all of these aforementioned distributions and associated correction amounts, one could apply a needed distribution to a particular tool 16 and tool holder 14 and then reapply this distribution as needed resulting in a savings of time and allowing the tooling process to occur at a much faster pace. The use of such a methodology, within the tool balancer 10 of the preferred embodiment of this invention will now be explained in greater detail.

(II). BALANCER CONTROL SYSTEM

A. HARDWARE

Referring now to FIG. 1 there is shown a tool balancer controller 32, of the preferred embodiment of this invention, and which is coupled to a speed sensor 34 by bus 36 and to a typical machine tool controller host (i.e., a "numerical controller") 18 by bus 38. The speed sensor 34 is mounted to the spindle housing 13 by means of a threaded coupling arrangement or by other conventional means, and detects the passage of a target 35 which is mounted upon movable spindle 12. Additionally, balancer controller 32 is coupled to the member 22 of the preferred embodiment of the invention, by bus 40 and is further coupled to a vibration transducer 42 by means of bus 44. The vibration transducer 42 is mounted to the spindle housing 13 by a thread coupling arrangement or by other conventional means. Transducer 42 detects vibrations induced in the housing 13 by the rotation of unbalanced mass in, attached, or coupled to the spindle 12.

Additionally, a number of adjustment screws 46 are longitudinally and movably mounted in the casing 23 of object reception member 24 and member 22, for balance adjustment of the members 22 and 24 themselves, and to counteract any inaccuracies experienced in the mounting of members 22, 24 to the spindle 12, and of the spindle 12 itself. Generally, the members 22 and 24 are operationally under the control of the balancer controller 32 which commands or activates these members 22 and 24 in response to data which is received from the vibration transducer 42 along bus 44, from the speed sensor 34, along the bus 36, and/or from the host 18 along bus 38. The machine tool controller host 18 controls spindle 12 by means of data commands along bus 20.

Figure 4:
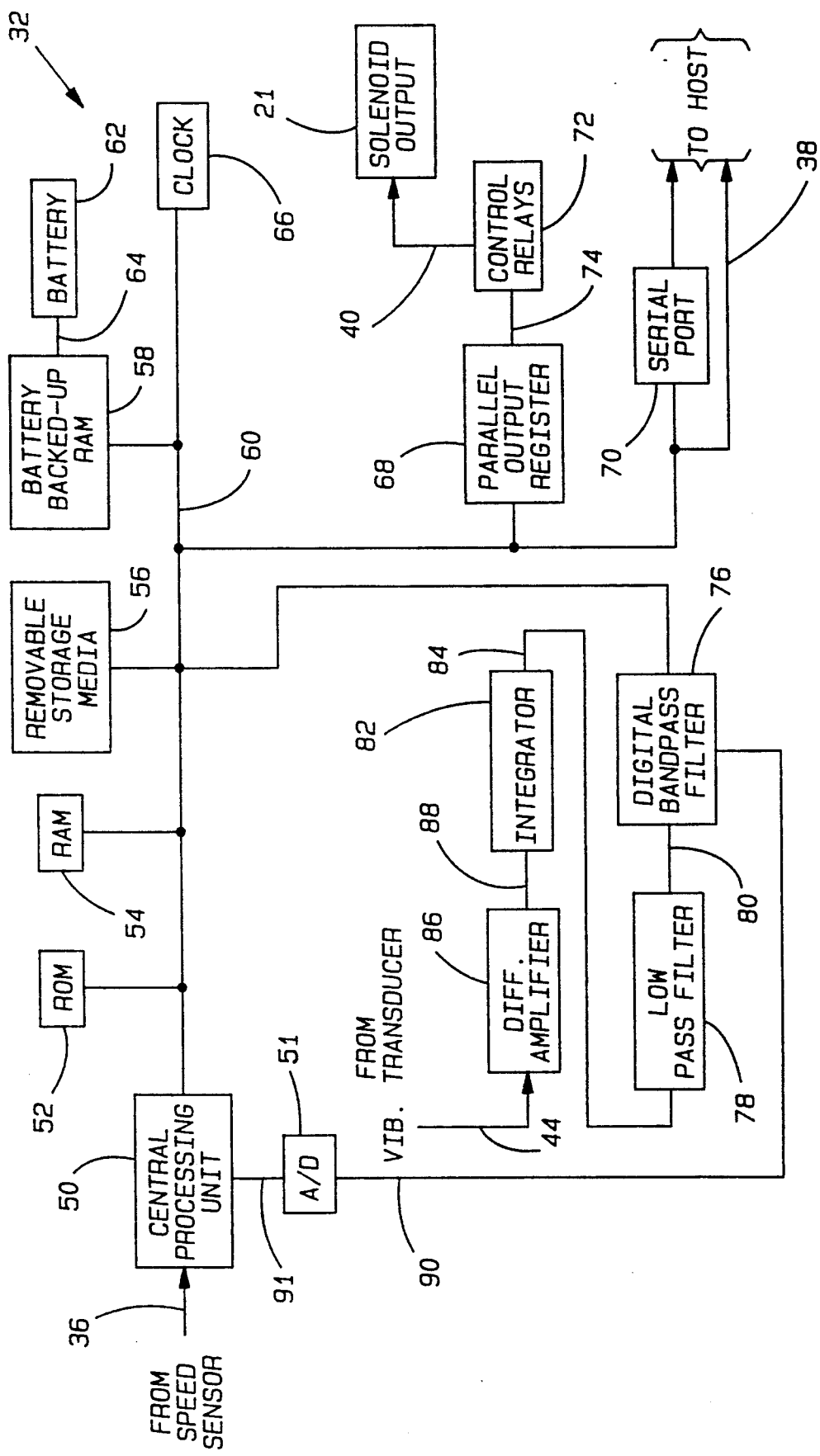
FIG. 4 is a block diagram of the balancer controller of the preferred embodiment of this invention and shown generally in FIG. 1.

Referring now to FIG. 4 there is shown the hardware architecture of the balancer controller 32 as comprising a central processing unit 50 which is coupled to the speed sensor 34 by means of bus 36. The central processing unit 50 is further coupled to a read only memory (ROM) 52, a random access memory (RAM) 54, a removable storage media (RSM) 56, and a battery backed up random access memory (BRAM) 58, by means of bus 60. The battery backed up random access memory 58 is further coupled to a typical battery 62 by means of bus 64 and a typical system clock 66 is also coupled to bus 60 and is in communication with the central processing unit 50.

Additionally, a parallel output register 68 and a serial output port 70 are both coupled to bus 60 and are in further communication with the central processing unit 50. The serial port 70 and the bus 60 are in communication with the machine tool controller host 18 by means of bus 38 while the parallel output register 68 is coupled to a plurality of air control relays 72 by means of bus 74. The control relays 72 are then coupled to solenoid operated air valves 21 by means of bus 40. Each of the air valves 21 is uniquely associated, in the preferred embodiment of this invention, with one of the pockets 26 within the member 22, as shown best in FIG. 2. When actuated, an air valve 21 allows compressed air to flow through an orifice 27 its uniquely associated cavity 26 within the containment member 22, holding a balancing object 28. The pressure differential created by this air flow will move this object 28 (or several of "targeted" objects 28, if more than one of the air valves 21 is actuated) into their corresponding pocket or cavity 26 in the object reception member 24.

Further, as shown best in FIG. 4, bus 60 is coupled to the output of a digital band pass filter 76 which has an input which is coupled to the output of a low pass filter 78 by bus 80. The low pass filter 78 has an input which is coupled to the output of an integrator 82 by means of bus 84 while the input of the integrator 82 is coupled to the output of a differential amplifier 86 by means of bus 88.

In operation, a signal from the vibration transducer 42, which is indicative of the amount of vibration or imbalance present upon the spindle 12 is coupled to the differential amplifier 86 by means of bus 44. The amplifier 86 then amplifies the received signal and this amplified signal is placed onto bus 88 to the integrator 82. The integrator 82 then, in the preferred embodiment of this invention, performs a standard mathematical integration upon the signal on bus 88 in order to convert the signal to a measure of displacement upon the spindle housing 13. Integrator 82 then produces an output signal upon bus 84 to the low pass filter 78 which eliminates high frequency components of the output signal on bus 84 in order to insure accuracy of the digital band pass filter 76. That is, the low pass filter 78 produces a filtered output onto bus 80 which is input into the digital band pass filter 76. Filter 76 then produces an output onto bus 90 and which is thereafter input into the analog to digital convertor 51 and then to the central processing unit 50, by means of bus 91.

It should be noted that the digital band pass filter 76 may assume a narrow band personality in which certain frequency components, associated with signal on bus 80, are filtered out. For example, frequency components of $\pm 60$ hz (at a "Q" of the spindle 12 equal to 10), may be filtered out. The digital band pass filter 76 may also assume a wide band personality in which frequency components associated with signals on bus 80, above approximately 20 kilohertz, are eliminated. The exact personality assumed by the digital band pass filter 76 is defined by the central processing unit 50 by signal on bus 91. In the preferred embodiment of this invention, filter 76 is normally made to output a sine wave whose amplitude is substantially equal to the vibration level of the spindle 12 (and hence imbalance of the tool 16 and tool holder 14). The amplitude and associated phase angle of imbalance may be derived from this output on bus 90, by the processor 50 using typical techniques such as a Discrete Fourier Transformation.

In operation, the central processing unit 50 receives information from filter 76 (along bus 90, which indicates the vibration level and phase angle of the tool 16), from sensor 34 (along bus 60) and which indicates the speed of the spindle 12, and from host 18. This received information then causes the central processing unit 50 (which is under stored program control) to either select certain of the relays 72 so as to energize certain of the solenoid valves 21 thereby causing certain of the objects 28 to be transmitted across space 25 to member 24 so as to achieve a desired balance condition after the spindle 12 has been stopped momentarily, by host 18 using commands along bus 20 and indexed to a selected and standard reference position. This received information may also cause processor 50 to cause some of the objects 28 to be retransmitted back to the member 22 and/or to send information to host 18 through bus 38. The activation or deactivation of certain of the control relays 72 is done by means of a signal on bus 60 which is sent to the parallel output register 68 and which is later input or impressed upon certain of these relays 72 by means of bus 74.

To send or to "retransmit" objects 28 back to the containment member 22 (as shown best in FIG. 2), separate ones of the solenoids 21 are selectively activated by relays 72 and upon their activation, compressed air is caused to be forced through selected conduit 306 connected to a selected cavity 26 which causes the object 28, within the selected cavity 26 of member 24, to be retransmitted back across gap 25 to its containment pocket 26, in member 22. Conduits 306 are coupled to these selected cavities 21, of members 24, by means of a hollow labyrinth structure 308. Further, an emptying solenoid 310 is also coupled to certain of the relays 72 and when activated causes air to be forced through conduits 306, of substantially all of the cavities 26, of member 24, (thought structure 308) thereby effectively forcing the retransmission of substantially all of the objects 28 contained within the member 24.

As stated, the central processing unit 50 acts under stored program control which may be entirely resident in removable storage media 56, such as a floppy disk, or which may be distributed in the random access memory 54, the read only memory 52, or the battery backed up random access memory 58. The exact distribution of this stored program will be explained in Section (II)(b) of this discussion. The clock 66 is used, by the preferred embodiment of this invention, to keep typical "time of day" logging information. In the preferred embodiment of this invention, the central processing unit 50 comprises a microprocessor which is manufactured by the Intel Corporation of Palo Alto, Calif. and is referenced by industry model number 80C196KB. Additionally, in the preferred embodiment of this invention, integrator 82 is manufactured by National Semiconductor, Inc. and is referred to by industry model number LM324 and low pass filter 78 is also manufactured by National Semiconductor, Inc. and is referred to as industry model number LM324. Further, the digital band pass filter 76, of the preferred embodiment of this invention, is manufactured by Maxim, Inc. and is referred to by standard industry model MAX260. The clock 66, in the preferred embodiment of this invention, is manufactured by Motorola, Inc. and is referred to as industry model number 146818A and is a standard time of day clock. In order to more fully understand the operation of the tool balancer 10 of the preferred embodiment of this invention, it is now necessary to discuss the software operation of the balancer controller 32, which will more fully explain the use of the balancing architecture to correct tool imbalance.

B. SOFTWARE OPERATION

Figure 5:
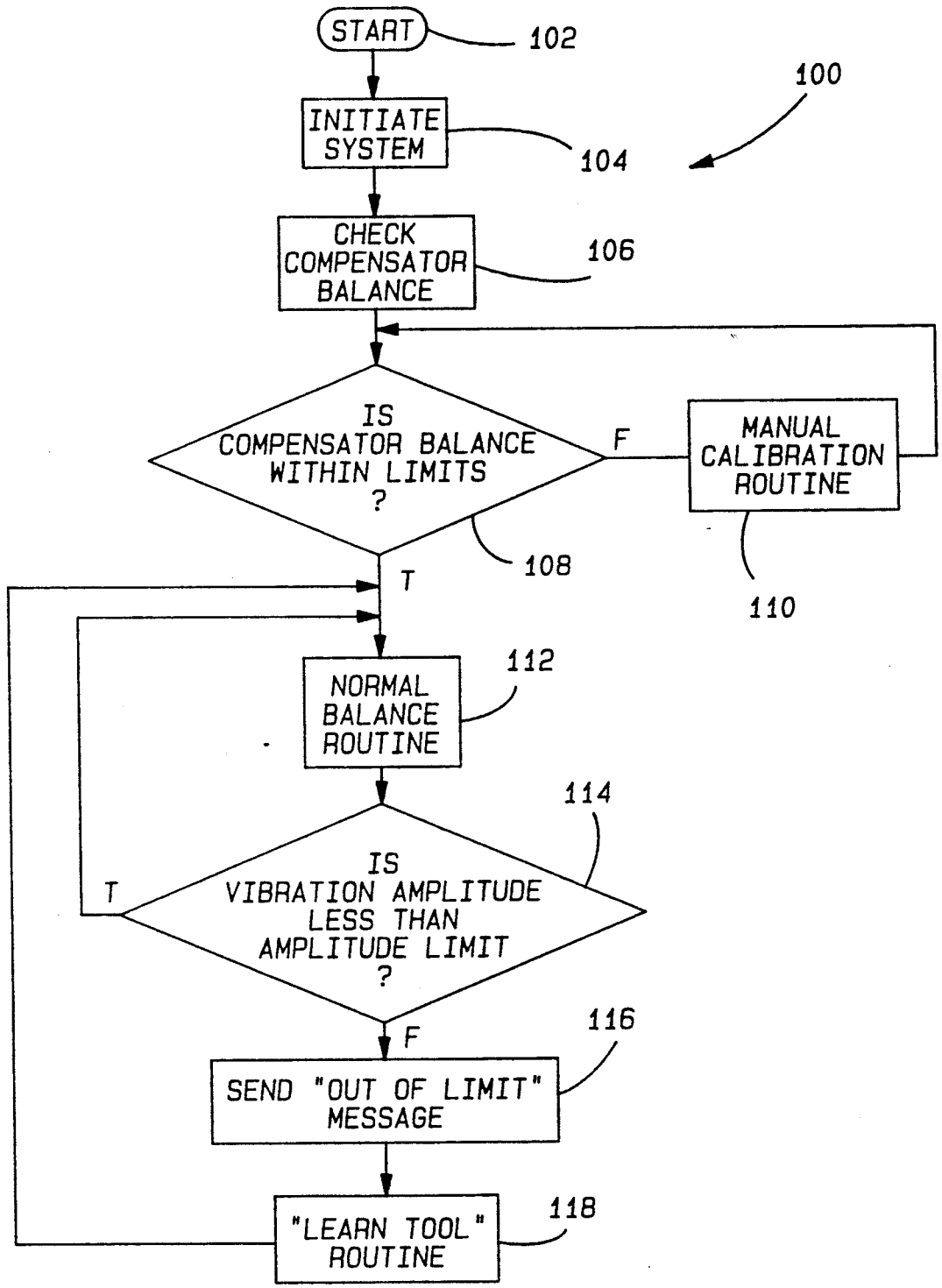
FIG. 5 is a flow chart illustrating the general operational sequence of steps associated with the software contained within the balancer controller of the preferred embodiment of this invention and shown generally in FIG. 1.

The general operational features of the balancer controller software generally indicated in flow chart 100 are shown in FIG. 5. Specifically, flow chart 100 begins with a "start" or first step 102 which is followed by an "Initiate System" routine 104. After the system has been initiated, step 104 is followed by step 106 which defines a "Check Compensator Balance" routine and which seeks to determine if substantially any imbalance is produced which affects the balance of the tool 16, by the tool balancer 10 itself. Step 106 is then followed by step 108 which requires a determination to be made as to whether or not the compensator balance is within predefined limits. If the compensator balance is not within predefined limits, then step 108 is followed by step 110 which requires a "Manual Calibration" routine to be done by the tool balancer 10. If the determination in step 108 is such that the compensator balance is within limits, then step 108 is followed by step 112 which requires a "Normal Balance" routine to be accomplished. Step 112 is then followed by step 114 which requires the central processing unit 50 to determine if the vibration amplitude received from the vibration sensor 42, after the "Normal Balance" routine is completed, is less than a predefined amplitude limit. If the measured vibration amplitude is less than this predefined limit, then step 114 is followed by step 112. If this vibration amplitude is greater than the amplitude limit that has been predefined, then step 114 is followed by step 116 which requires the central processing unit 50 to send a message to the machine tool controller host 18 by means of bus 38 indicating this fact. Step 116 is then followed by step 118 which requires the central processing unit 50 to perform a "Learn Tool" routine. Step 118 is then followed by step 112.

To understand the "Check Compensator Balance" routine associated with step 106, reference is made to FIG. 6 which shows the steps associated with this routine of step 106. Specifically, the "Check Compensator Balance" routine comprises an initial step 120 requiring the determination of whether the vibration amplitude received by the central processing unit 50 as a result of the output of filter 76 is greater than a predefined amplitude limit. This predefined limit may be arbitrarily selected by a user of the balancer 10 and is chosen according to the balance condition that such a user would normally desire to seek. If the determination is such that this amplitude limit is exceeded, then step 120 is followed by step 122 which requires a "Pre-Balance Compensation" routine to be accomplished. If the determination in step 120 is such that the vibration amplitude is less than this predefined amplitude limit, then step 120 is followed by step 108.

To understand the "Pre-Balance Compensation" routine of step 122, reference is now made to FIG. 7 in which the "Pre-Balance Compensation" routine of step 122 is shown to have an initial step 124 requiring the removal of all weights from the object reception member 24. This, as indicated earlier, is accomplished by the selective energization of the emptying solenoid 310 (FIG. 2) by relays 72. This energization is, as previously discussed, effective to retransmit all of the objects 28, across air gap 25, to member 22 such that member 24 now contains substantially none of the objects 28. Step 124 is then followed by step 126 which requires the movement or spinning of the tool 16 at a predetermined speed. This predetermined speed may be virtually any desired speed, within the operating range of the tool. Step 126 is, in part, accomplished by communicating the needed or desired speed to the host 18, by means of bus 38. Step 126 is then followed by step 128 which requires the central processing unit 50 to obtain the current vibration amplitude from the filter 76, in a manner previously explained.

Step 128 is then followed by step 130 which requires the central processing unit 50 to obtain the vibration angle, in a known manner, from the obtained vibration amplitude associated with step 128. Step 130 is then followed by step 132 which requires the central processing unit 50 to send a message to the machine tool controller host 18 by means of bus 38 in order to stop the spindle 12. Step 132 is then followed by step 134 which requires the addition of a predetermined amount of objects 28 to the object reception member 24, in a manner previously discussed. These objects 28 are added by the selective activation of certain of the air control relays 72 which cause certain of the objects 28 initially residing within the member 22 to be transmitted across the space 25 to the object reception member 24 and, specifically, to associated cavities 26 within that member 24. The amount of weight to be added, in this step 34, may be chosen to be virtually any desired quantity within the range of weights used.

Step 134 is then followed by step 136 which requires the movement or the spinning of the tool at the predetermined speed associated with step 126. Step 136 is then followed by step 138 which requires the central processing unit 50 to obtain the new or current vibration amplitude from the filter 76, in a manner previously discussed. Step 140 then follows step 138 and requires the central processing unit 50 to obtain the vibration angle, in a known manner, from the recently received vibration amplitude associated with step 138. Step 140 is followed by step 142 which requires the spindle 12 to be stopped by commands, a long bus 20, from the machine tool controller 18.

Step 142 is followed by step 144 which requires the central processing unit 50 to calculate a correction angle in a manner explained in U.S. Pat. Ser. No. 383,925, filed on Jul. 21, 1989 and entitled "Computerized Control System and Method For Balancers" and which is fully incorporated herein by reference. Step 144 is then followed by step 146 which requires the central processing unit 50 to calculate the required weight of correction by determining, based upon this correction angle, the exact screw 46 and the depth to which this screw 46 should be placed into casing 23. Step 146 is then followed by step 148 which requires the manual (or automatic) performance of the calculated weight of correction of step 146. It should be realized, by one of ordinary skill in the art, that at step 102, (FIG. 5), it is necessary to calibrate (either manually or automatically) the weight correction achieved by various depths of screws 46 within the casing 23. This may be accomplished by reading the vibration amplitude and angle for the spindle at a given speed for various depths of screws 46. In this manner, a table may be constructed and this table may be used, in step 146, to give the desired depth, of the screws 46 so required.

Figure 8:
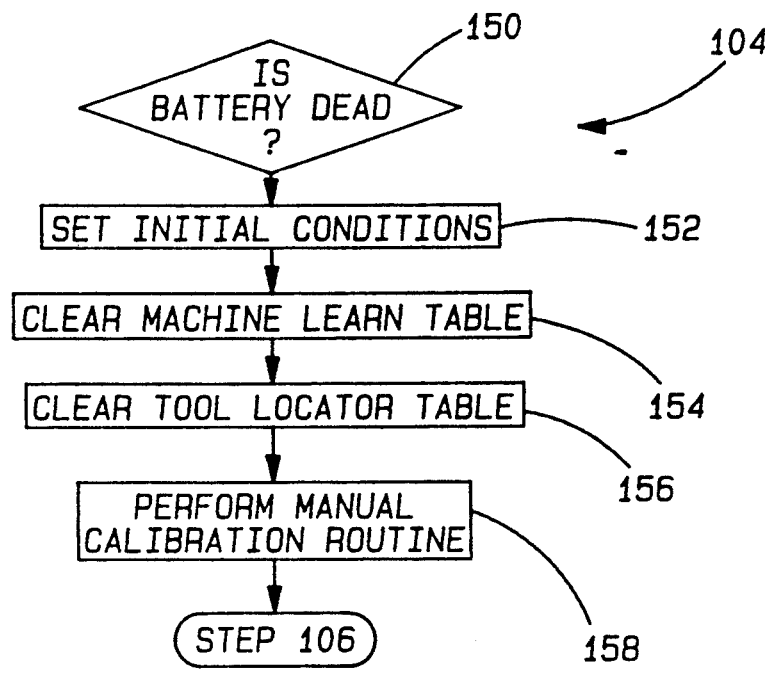
FIG. 8 is a flow chart illustrating the sequence of steps comprising the "Initialization" routine shown generally in FIG. 5.

To understand the "Initiate System" routine of step 104 of the general system flow chart 100, reference is now made to FIG. 8 in which there is shown the sequence of steps associated with this routine. Specifically, the "Initiate System" routine of step 104 comprises an initial step 150 requiring the determination of whether or not the battery 62 is inactive. This is done by communication between the host 50 and the memory 58 through bus 60. If the determination associated with step 150 is that the battery is not deactivated, then step 150 is followed by step 106. If the determination associated with step 150 is such as to indicate that the battery 62 is indeed deactivated or "dead", then step 150 is followed by step 152 which requires certain initial conditions to be specified by the central processing unit 50. These initial conditions include the limits associated with the compensator balance of step 108 and the amplitude limit associated with step 114 as well as the predetermined speed of steps 126 and 136 and the weight of step 134. These initial values are programmable and may be modified as normally desired and may be resident within either memories 54, 56, or 58.

Step 152 is then followed by step 154 which requires the central processing unit 50 to clear the Machine Learn Table (stored in memory 58 and to be discussed herein later). Step 154 is followed by step 156 which requires the central processing unit 50 to clear or alleviate the Tool Locator Table (stored in memory 58 and to be discussed herein later). Step 156 is then followed by step 158 which requires the performance of a "Manual Calibration" routine associated with step 110 and which will be hereinafter explained. Step 158 is then followed by step 106.

Figure 9:
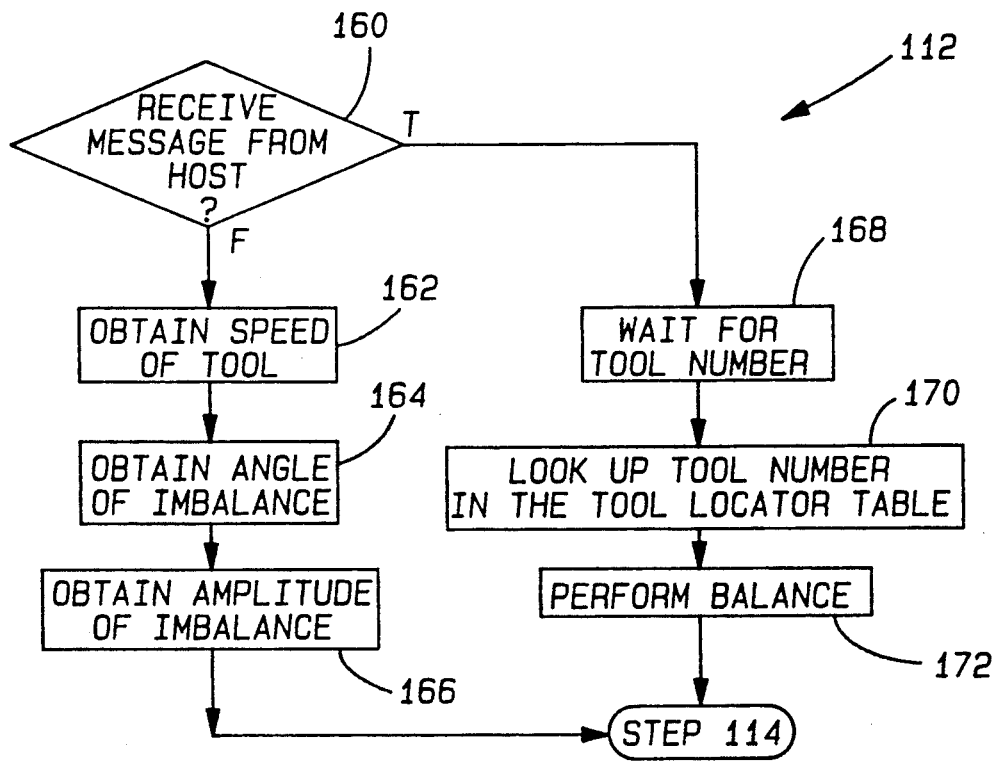
FIG. 9 is a flow chart illustrating the sequence of steps comprising the "Normal Balance" routine shown generally in FIG. 5.

Referring now to FIG. 9, there is shown the "Normal Balance" routine associated with step 112 of flow chart 100. Specifically, the "Normal Balance" routine of step 112 comprises an initial step 160 requiring the determination of whether or not a "tool change" message or communication was received by the central processing unit 50 from the machine tool controller host 18, through bus 38. If such a message has not been received from the host 18, then step 160 is followed by step 162 which requires the central processing unit 50 to obtain the current speed of the spindle 12 from the speed sensor 34, through bus 36. Step 162 is then followed by step 164 which requires the central processing unit 50 to obtain or to determine, in a known and previously discussed manner, the angle of imbalance. Step 164 is followed by step 166 which requires the central processing unit 50 to obtain the amplitude of imbalance. Specifically, the information associated with both steps 164 and 166 are obtained from the vibration transducer 42 by means of bus 44 through the operation of filter 76. Step 166 is then followed by step 114. That is, as long as the same tool 16 is being used, the balancer 10 performs a balance once and then continually measures the speed and angle and amplitude of imbalance to see if the previous balance condition is no longer adequate. If the prior balance is no longer adequate (i.e. if the measured vibration level is less than the defined limit), then processing unit 50 sends a message to host 18, through bus 38, which is effective to have host 18 stop the spindle 12 by control commands on bus 20. Thereafter, a new balance is accomplished by the introduction of different objects 28 upon member 24. The balance distribution methodology which is to be used, will hereinafter be explained in reference to FIGS. 10-14 hereinlater.

If the determination associated with step 160 is that a "tool change" message has been received from the host controller 18, then step 160 is followed by step 168 which requires the balancer controller 32, and specifically the central processing unit 50 therein, to wait for a tool number to be transmitted from the machine tool controller host 18. Step 168 is then followed by step 170 which requires the central processing unit 50, after a tool number has been transmitted from the machine tool controller host 18, to look up that transmitted tool number in the Tool Locator Table which will hereinafter be explained. Step 170 is then followed by step 172 which requires the central processing unit 52 performs the balance specified by the Tool Locator Table. Step 172 is then followed by step 114. As before, the balance of step 172 is performed by the introduction or transmission of certain of the objects 28 to member 24 and as before, this balance condition is maintained, for this tool, as long as the measured vibration level does not exceed a predefined limit.

Figure 10:
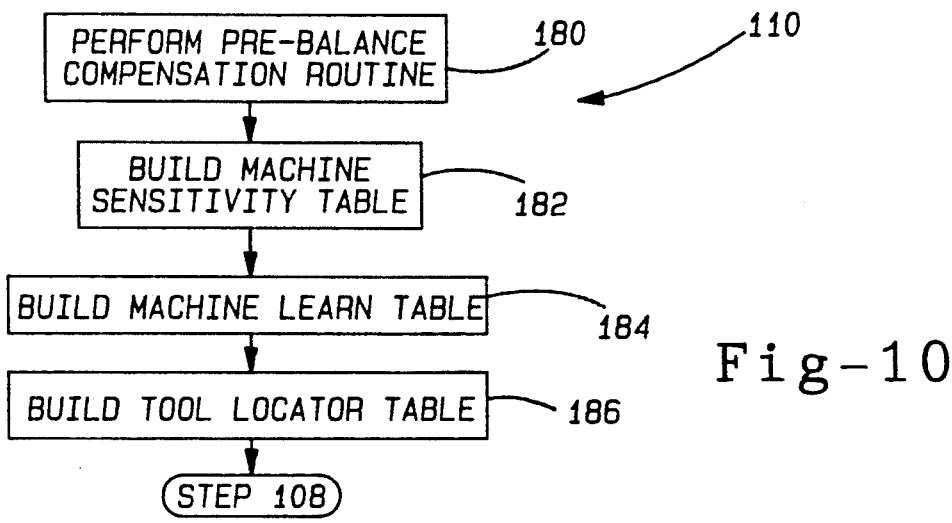
FIG. 10 is a flow chart illustrating the sequence of steps comprising the "Manual Calibration" routine shown generally in FIG. 5.

Referring now to FIG. 10, there is shown the steps associated with the "Manual Calibration" routine of steps 110 and 158 of flow charts 100 and 104 respectively. That is, the "Manual Calibration" routine of steps 110 and 158 comprises an initial step 180 which requires the central processing unit 50 to perform a "Pre-Balance Compensation" routine associated with step 122 of FIG. 6 and shown generally in FIG. 7. Step 180 is then followed by step 182 which requires central processing unit 50 to build a Machine Sensitivity Table (which is stored in memory 58 and which will be hereinafter explained). Step 182 is then followed by step 184 which requires the central processing unit 50 to build a Machine Learn Table (which is stored in memory 58 and which will be hereinafter explained). Step 184 is then followed by step 186 which requires the central processing unit 50 to build a Tool Locator Table (which is stored in memory 58 and will be hereinafter explained). Step 186 is then followed by step 108. Steps 182, 184 and 186 will now be explained.

Figure 13:
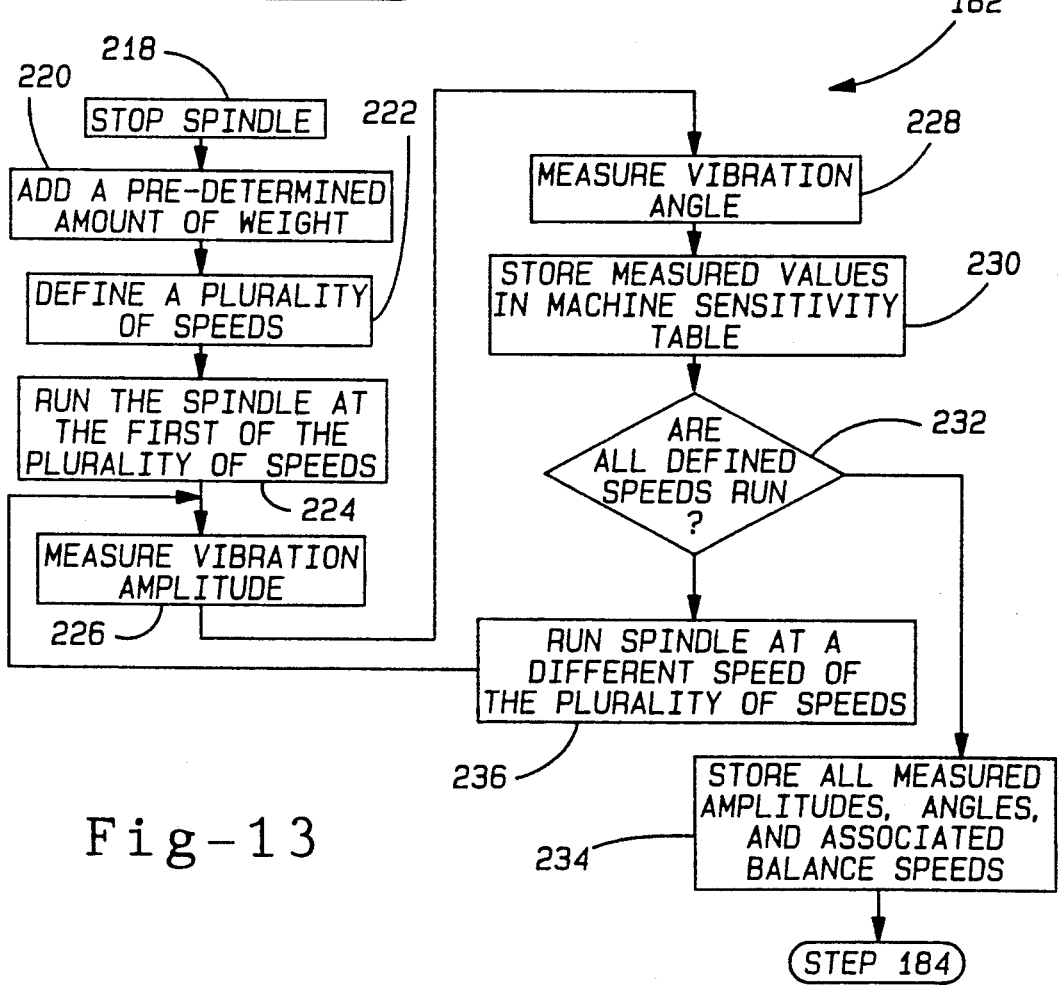
FIG. 13 is a flow chart illustrating the sequence of steps comprising the "Build Machine Sensitivity Table" routine shown generally in FIG. 10.

Referring now to FIG. 13, there is shown the sequence of steps associated with the building of a Machine Sensitivity Table associated with step 182 of flow chart 110. This sensitivity table is built in order to identify critical speeds of the machine that balancing may be achieved at, since it would be impossible to perform a balancing operation at all possible machine speeds due to the infinite amount of acquired data associated with these speeds. The table is therefore used to identify those crucial speeds that balancing must occur at. Specifically, the building of the machine sensitivity table of step 182 comprises an initial step 218 which requires the central processing unit 50 to send a message to the host machine tool controller 18 to stop the spindle 12. Step 218 is then followed by step 220 which requires the central processing unit 50 to add a predetermined number of the weighted objects 28 to the object reception member 24. Step 220 is then followed by step 222 which requires the central processing unit 50 to define a plurality of balancing speeds of the spindle 12 (normally these are pre-defined as initial system conditions). Step 222 is then followed by step 224 which requires the central processing unit 50 to run the spindle 12 at the first of the plurality of defined speeds associated with step 222.

Step 224 is then followed by step 226 which requires the central processing unit 50 to determine the vibration amplitude associated with the tool 16 at the first of the plurality of speeds at which the spindle 12 is run. Step 226 is then followed by step 228 which requires the central processing unit 50 to obtain or derive the vibration angle associated with the vibration amplitude received in step 226. This vibration amplitude and angle respectively associated with steps 226 and 228 are obtained from the vibration transducer 42 by means of bus 44 through the processing of the filter 76. Step 228 is then followed by step 230 which requires the central processing unit 50 to store the measured values in the Machine Sensitivity Table. Step 230 is then followed by step 232 which requires the central processing unit 50 to determine if all of the defined speeds have been run. If the determination of step 232 is such that all of the defined speeds in step 222 have been run, then step 232 is followed by step 234 which requires the central processing unit 50 to ensure that all measured amplitudes, angles, and the associated balance speeds are stored in the Machine Sensitivity Table. If the determination in step 232 is such that all of the defined speeds in step 222 have not been run, then step 232 is followed by step 236. Step 236 requires the central processing unit 50 to run the spindle 12 at a different one of the plurality of speeds and step 236 is then followed by step 226. It should be noted that when the central processing unit 50 "runs the spindle", it functionally, in the preferred embodiment of this invention, sends a message to the machine tool controller host 18 by means of bus 38 which will then enable the machine tool controller host 18 to control the spindle 12 by means of messages upon bus 20. This Machine Sensitivity Table may now be used to identify those "critical" speeds, of the spindle speeds selected, since these "critical" speeds will have large amplitude and phase angle vibration levels and balancing may then be desired or achieved at these speeds.

Figure 14:
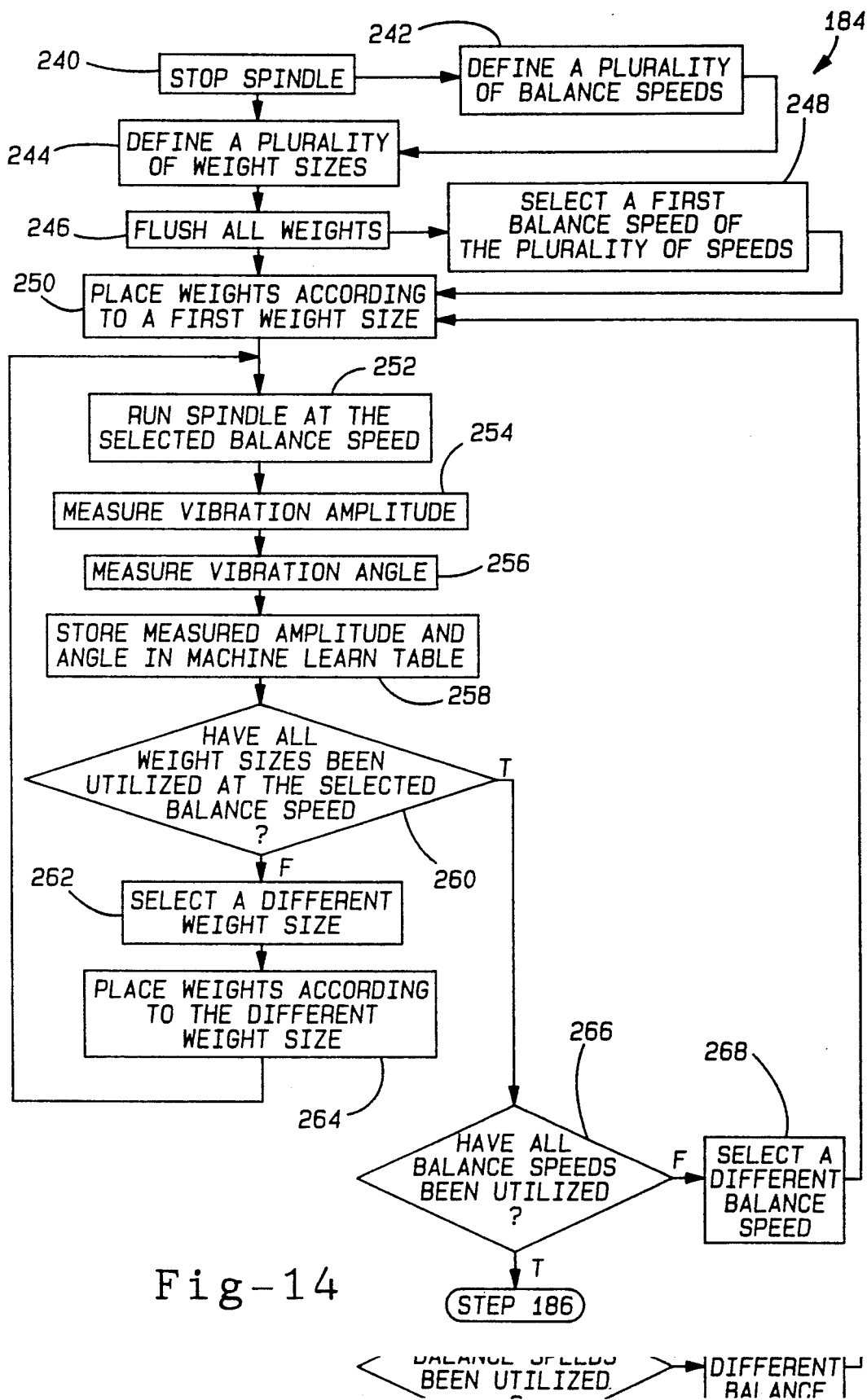
FIG. 14 is a flow chart illustrating the sequence of steps comprising the "Build Machine Learn Table" routine shown generally in FIG. 10.

Referring now to FIG. 14, there is shown the sequence of steps associated with the building of a Machine Learn Table associated with step 184 of flow chart 110. Specifically, the building of the Machine Learn Table comprises an initial step 240 which requires the stopping of the spindle 12. This normally occurs by means of a message from the central processing unit 50 to the machine tool controller host 18 by means of bus 38. The machine tool controller host 18 then sends a message by means of bus 20 to the spindle 12 in order to stop the spindle 12. Step 240 is then followed by step 242 which requires the central processing unit 50 to define a plurality of balance speeds desired. These balance speeds are to be the "critical" machine speeds which are identified by use of the Machine Sensitivity Table, built in accordance with the previously discussed steps of FIG. 13.

Step 242 is then followed by step 244 which requires the central processing unit 50 to define a plurality of weight sizes. These weight sizes, (each corresponding to unique distributions of objects 28) may be defined at system initialization or at step 152 after battery 62 has become deactivated.

Step 244 is then followed by step 246 which requires the central processing unit 50 to make sure that all of the weighted objects 28 have been removed from the object reception member 24. This is accomplished by signals upon bus 60 which activate so as to ensure activation of the emptying solenoid 310 (FIG. 2), so that substantially all of the weighted objects 28 are removed from the member 24 and placed into their original cavities 26, within the member 22.

Step 246 is then followed by step 248 which requires the central processing unit 50 to select a first balance speed of the plurality of balance speeds that were defined in step 242. Step 248 is then followed by step 250 which requires the central processing unit 50 to place the weighted objects 28 in a distribution pattern according to the first weight size defined in step 244. This is accomplished by the selective activation of certain of the relays 72 so as to cause certain of the weighted objects 28, then currently within cavities 26 within member 22, to move across (or to be transmitted across) the space 25 so as to be received by the cavities 26 defined within the member 24. Step 250 is then followed by step 252 which requires the running of the spindle at the selected balance speed associated with step 248. This is accomplished by signals upon bus 38, from the balancer controller 32, to the machine host controller 18 which will enable the controller host 18 to signal the spindle 12 by means of signals on bus 20 and which will enable the spindle 12 to be run at the first balance speed associated with step 248.

Step 252 is then followed by step 254 which requires the central processing unit 50 to obtain the measured vibration amplitude associated with the tool holder 14 at the selected balance speed. This is accomplished by signals on bus 44 from the vibration transducer 42 to the amplifier 56 and eventually to the filter 76 is a manner previously described. Step 254 is then followed by step 256 which requires the central processing unit 50 to obtain or derive the vibration angle associated with the measured vibration amplitude in step 254 in a previously described manner. Step 256 is then followed by step 258 which requires the central processing unit 50 to store the measured amplitude and measured or derived vibration angle in the Machine Learn Table. This Machine Learn Table may be placed in the random access memory 54, the removable storage media 56, or the battery backed-up random access memory 58. As stated however, it is desirable, and is done in the preferred embodiment of this invention, to place the entire Machine Learn Table in the battery backed-up random access memory 58 in order that the data associated with this table would not be lost due to a power failure of the controller 10.

Step 258 is then followed by step 260 which requires the central processing unit 50 to determine whether or not all the previously defined weight sizes, in step 244, have been utilized at the selected balance speed of step 248. If all of these weight sizes have not been utilized at this selected speed, then step 260 is followed by step 262 which requires the central processing unit 50 to select a different "weight size" (i.e. a distribution) of the plurality of "weight sizes" defined in step 244. Step 262 is then followed by step 264 which requires the distribution or placement of the weighted objects 28 according to this selected "weight size" in step 262. As before, this placement is accomplished by the selective activation of certain of the control relays 72 by means of signals on bus 60 from the central processing unit 50 and by means of the parallel output register 68. Step 264 is then followed by step 252.

If the determination in step 260 is that all of the "weight size" distributions have been utilized at the selected balance speed, then step 260 is followed by step 266 which requires the central processing unit 50 to determine whether or not all of the balance speeds, associated with step 242, have been utilized. If all of the balance speeds associated with step 242 have not been utilized, then step 266 is followed by step 268 which requires the central processing unit 50 to select a different one of the plurality of defined balance speeds associated with step 242. Step 268 is then followed by step 250. If the determination in step 266 is such that all of the selected balance speeds have indeed been utilized, then step 266 is, of course, followed by step 186. The Machine Learn Table is, as will be seen, used to factor or to correct the vibration amplitude and phase angle when calculating a needed correction factor during balancing.

Figure 11:
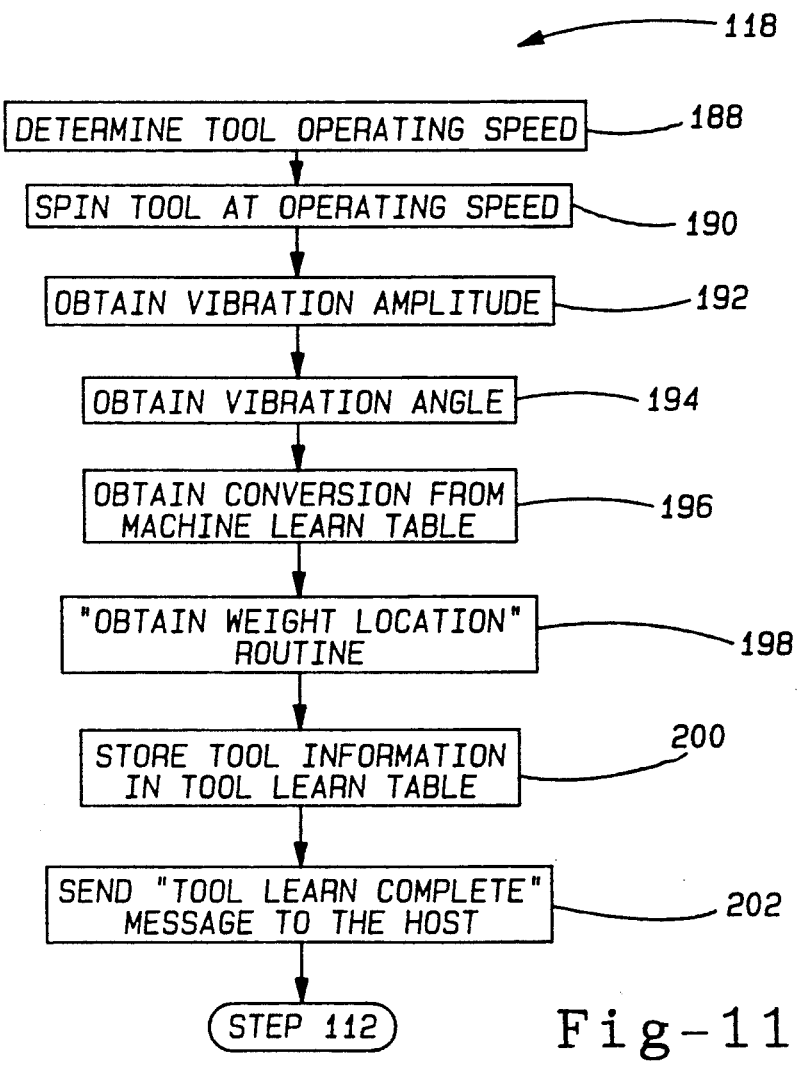
FIG. 11 is a flow chart illustrating the sequence of steps comprising the "Learn Tool" routine shown generally in FIG. 5.

Specifically, reference is now made to FIG. 11 which details the steps associated with the "Learn Tool" routine of step 118 of flow chart 100. This "Learn Tool" routine is used when a tool is first used as well as when the previously used balance condition (for that particular tool) is no longer adequate, as is the case after step 172 of flow chart 112. Specifically, the "Learn Tool" routine of step 118 comprises an initial step 188 requiring the determination of the tool operating speed associated with the tool to be learned. This determination is usually made by a request from the central processing unit 50 to the machine tool controller host 18 through bus 38. Step 188 is then followed by step 190 which requires the central processing unit 50 to have the tool spun or moved, upon or by spindle 12, at the operating speed of that tool. Step 190 is then followed by step 192 which requires the central processing unit 50 to obtain the vibration amplitude associated with the imbalance of that tool, at its operating speed. This vibration amplitude is obtained by the vibration transducer 42 through bus 44 after being processed by filter 76 in the manner previously discussed. Step 192 is then followed by step 194 which requires the central processing unit 50 to obtain or derive the vibration angle associated with the vibration amplitude in step 192, and is done in the previously explained manner. Step 194 is then followed by step 196 which requires the obtainment of the conversion from the Machine Learn Table defined by the speed used in steps 188 and 190. That is, we must add the vibration amplitude and phase angle, for the particular speed, associated with the "Machine" or spindle 12 to the measured tool imbalance in order to get the true total imbalance. The Machine Learn Table has a listing of the vibration amplitudes and phase angles associated with the spindle 12 according to a variety of speeds.

Figure 12:
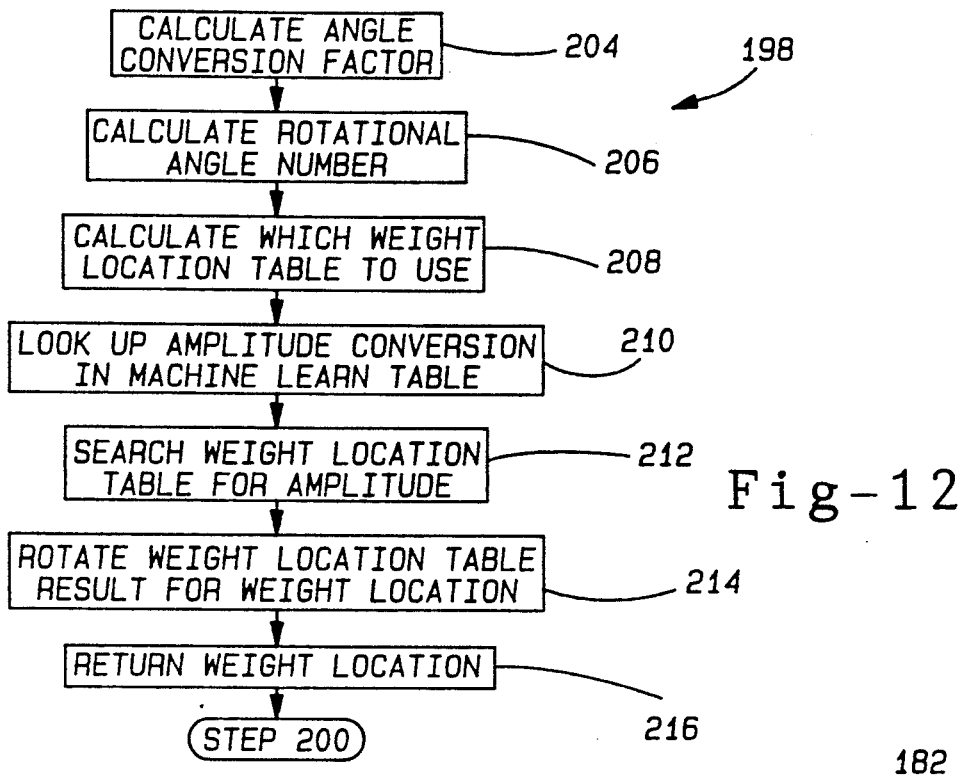
FIG. 12 is a flow chart illustrating the sequence of steps comprising the "Obtain Weight Location" table shown generally in FIG. 11.

Step 196 is then followed by step 198 which requires the central processing unit 50 to perform the "obtain weight location routine" as shown in FIG. 12 and which will be hereinafter explained. Step 198 is then followed by step 200 which requires the central processing unit 50 to store tool information associated with this tool in the Tool Learn Table. Step 200 is then followed by step 202 which requires the central processing unit 50 to send a message to the machine tool controller host 18 by means of bus 38 that the tool has been learned. In this manner, each of the individual machine tools to be employed in a tooling process is individually learned and is then stored in a Machine Learn Table such as that associated with step 184 in the sequence of steps associated with flow chart 110 and the object distribution necessary to balance that particular tool may be readily stored for later use thereby ensuring a relatively quick balance. That is, we know the required balance condition needed and we know the amount and direction of balance associated with a plurality of balance distributors. Therefore, we may simply "match" a needed balance condition with a known distribution in order to give the necessary distribution.

Referring now to FIG. 12, there is shown the sequence of steps associated with the "Obtain Weight Location" routine associated with step 198 of flow chart 118. Specifically, the obtain weight location routine 198 comprises an initial step 204 requiring the central processing unit 50 to calculate an angle conversion factor which entails a review of the Machine Learn Table as previously described in Step 196. That is, at the speed of interest, processor 50 must locate the vibrational angle associated with the spindle 12 or the "machine" itself and which resides within the Machine Learn Table. Additionally, a weight locator table is employed which simply has calculated corrected amounts and angles associated with various pocket distribution patterns and which has previously been explained with reference to Tables 2 and 3. This table stored in memory 52, is divided into two main parts associated with the two different correction plane types (i.e. those in close proximity to a single pocket 26 or those in close proximity to the middle of two of the pockets 26). Step 204 is then followed by step 206 which requires the central processing unit 50 to calculate a rotational angle number. Specifically, this Rotational $$\text{Angle Number} = \text{INT} \left[ \frac{(2) \times (\text{Number of Objects Used}) \times \left( \frac{\text{Corrected}}{\text{Angle}} \right) + 0.5}{2} \right]$$

Step 206 is followed by step 208 which requires the central processing unit 50 to calculate which weight location table to use (example of specific weight location table entries are shown in Table 3). That is, Table=(Rotational Angle Number×2) MOD2. Step 208 is then followed by step 210 which requires the central processing unit 50 to look up the amplitude conversion in the Machine Learn Table. A corrected amplitude is then divided based upon the addition of the measured and the stored amplitudes. Step 210 is followed by step 212 which requires the central processing unit 50 to search the weight location table, defined by Step 208, for the corrected amplitude. Step 212 is then followed by step 214 which requires the central processing unit 50 to rotate or to translate the balance correction obtained from the Weight Location Table (which are in one of two previously discussed correction planes) so as to produce equivalent correction in the actual imbalance plane. This rotational angle will yield the amount of rotation needed to make the necessary correction and is used to derive the needed pocket combination by specifying this need correction plane and the amount that the pocket combination, of the weight locator table, must be moved. Step 214 is then followed by step 216 which requires the central processing unit 50 to return the weight location desired. Step 216 is then followed, of course, by step 200.

In the previously described manner, a Tool Table may be built and stored and may be uniquely associated with each of the individual tools to be placed within the tool holder 14. That is, once an initial balance condition is known for a particular tool 16, this balance condition is stored and may be later used when that tool is replaced back into the tool holder 14. Should this condition not be such as to provide continual balance correction, in the case of later imbalance, this will be readily apparent by signals from the vibration transducer 42, along bus 44 to the balancer controller 32. At this point, a new tool learn routine may be accomplished and the new balance condition associated with the new and updated learn routine may be incorporated and substituted for the original tool learn information. In this manner, it may be readily apparent to one of ordinary skill in the art that a high degree of balance repeatability may be created and a concomitant increase in the speed associated with the performance of the needed balance condition.

Figure 15:
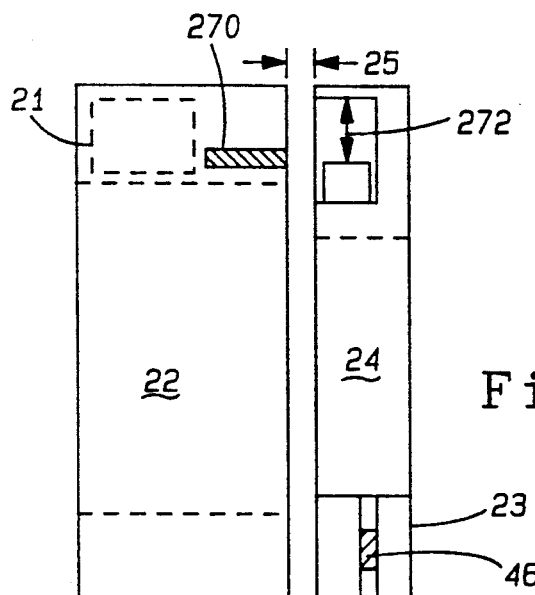
FIG. 15 is a partial cut-away side view of a second, and alternate embodiment, of the tool balancer shown generally in FIG. 1.
Figure 16:
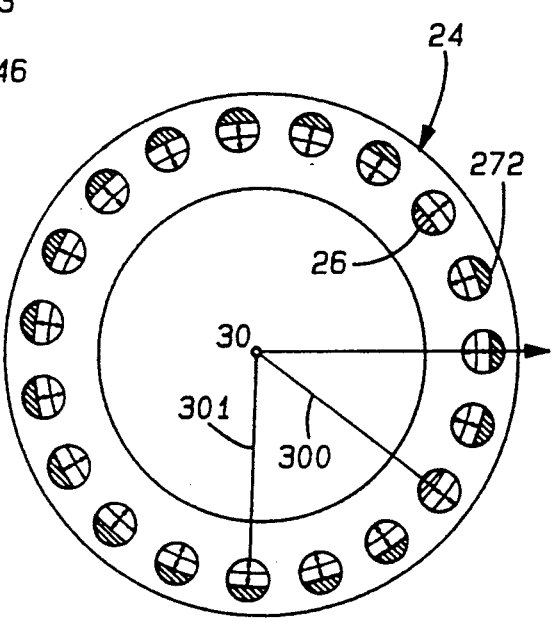
FIG. 16 is a plan view of the tool balancer, made according to the teachings of the second embodiment of its invention and shown generally in FIG. 15.

Referring now to FIGS. 15 and 16, there is shown an alternative embodiment of the aforedescribed embodiment of this invention. That is, in this second embodiment, the object reception member 24 is shown as comprising a single ring having the plurality of weighted objects 28 dispersed either a distance 300 or 301 with respect to the center of rotation 30 of member 24 and the object containment member 22 is eliminated. Alternatively, member 22 could be made to have the objects 26 while eliminating member 24. Each of the plurality of balance objects 28 is held in either the inner position (i.e. at a distance 300 from point 30) or an outer position (i.e. at a distance 301 from point 30), by a detent mechanism 272. Mechanism 272 is designed such that when acted upon by lever arm 270, extending from solenoid 21, the object 28 is rotated or is moved to the outer position and when the solenoid 21 is deactivated, the object 28 is rotated or is moved back to the inner position. The solenoids 21, including lever arms 270, are then coupled to the control relays 72 such that the distance of each of the objects 28 from the center of rotation 30 may be adjusted by the selective activation, or deactivation, of certain of the control relays 72. In this manner, the objects need not be transmitted or communicated across distance 5 from the containment member 22 to the reception member 24 but may simply be moved to the inner or the outer position of the reception member 24 or alternatively, of the member 22. The distances 300, 301 that the individual objects 28 are moved from the center of rotation 30 would be fixed in the design of this second embodiment of the balancer 10. The weight of the objects 28 and distance 300, 301 would establish the correction capacity of the balancer 10 and various unique patterns of balance could be experimentally found or calculated in the manner previously set forth above. In fact, unique balance conditions may be stored and used in substantially the same manner as that associated with the description of the stored program in FIGS. 6–14. Additionally, it should also be readily apparent to one of ordinary skill in the art that while the tool balancer 10 of the preferred embodiment of this invention is shown in FIG. 1 in a horizontal tool machine, that the tool balancer 10 may be equally applicable to a vertical machine tool situation as well as to various other types of machine tool situations, and the illustration of the tool balancer 10, in conjunction with a horizontal tooling machine, is not meant to limit the applicability of the tool balancer 10 of the preferred embodiment of this invention to the situation so illustrated in FIG. 1.

In yet a third embodiment, member 24 is made to originally have substantially all of its pockets 26 contain one object 28. Thereafter, objects 28 are selectively removed to member 22 by means of the selective activation of certain of the solenoids 21. The removal of these objects 28 produces a plurality of desired and needed balance conditions and these conditions may each be experimentally derived in the manner set forth above and stored for future use in accordance with the teachings of the preferred embodiment of this invention as shown, in part, by reference to FIGS. 6–14.

III. EPILOGUE

It should be readily apparent to one of ordinary skill in the art that the preferred embodiment of this invention performs relatively fast balancing operations upon high speed machine tools and that the balance so achieved may be uniquely associated with individual tools 16 and tool holders 14 which are used in a machining process and which may be stored so as to be readily usable upon each application of the individual tools 16 and tool holders 14 that need to be balanced. It should equally be apparent to one of ordinary skill in the art that this balance condition is relatively fast and requires no external and complicated mechanical equipment such as motors or gears. Further, it is to be understood that the invention is not limited to the exact construction or method illustrated and described above, but that various changes and modifications may be made without departing from the spirit and scope of the invention as defined in the following claims.

We claim:

1. An apparatus for correcting imbalance associated with a tool rotating in a spindle housing, said apparatus comprising:
   a first member coupled to said spindle housing and having a plurality of weighted objected therein;
   a second member coupled to said tool and spaced at a certain distance away from said first member, said second member having a plurality of reception cavities therein which are alignable in relation to each of said plurality of weighted objects; and
   object movement means coupled to said first member for correcting said imbalance by transmitting certain of said plurality of weighted objects from said first member across said certain distance to certain of said reception cavities within said second member.

2. The apparatus of claim 1 further comprising:
memory storage means coupled to said first member for storing the identity of said certain of said reception cavities.

3. The apparatus of claim 1 further comprising:
speed means coupled to said object movement means for measuring said speed of said tool rotation and for providing said measured speed to said object movement means; and
vibration measurement means coupled to said object movement means for measuring said vibration level associated with said tool and for providing said measured vibration level to said object movement means.

4. The apparatus of claim 1 wherein said plurality of said weighted objects each substantially comprise a sphere.

5. The apparatus of claim 1 wherein said first and said second members each have vibration levels associated therewith, said apparatus further comprising:
means coupled to said first and to said second members for substantially eliminating said vibration level associated with said first and said second members.

6. The apparatus of claim 5 wherein said means comprises:
a plurality of screws.

7. The apparatus of claim 1 wherein said object movement means comprises:
a microprocessor under stored program control; and
a plurality of relays each having an input coupled to said microprocessor and each further having an output coupled to a unique one of said plurality of weighted objects.

8. An apparatus for reducing vibration of a rotating tool, said apparatus comprising:
a member coupled to said tool and having a plurality of weighted objects movably disposed thereon;
movement means coupled to each of said plurality of weighted objects for moving one of said plurality of weighted objects a certain distance upon said member, said movement being effective to reduce said vibration of said tool;
memory storage means coupled to said movement means for storing and selecting said certain distance that said one of said plurality of weighted objects is moved upon said member; and
each of said plurality of weighted objects substantially comprise a sphere.

9. A method for balancing a rotating tool having a vibration imbalance associated therewith, said method comprising:
(a) providing a plurality of weighted objects;
(b) defining a plurality of distributions of said weighted objects around said tool;
(c) determining an amount of imbalance correction associated with each one of said plurality of defined distributions;
(d) storing each of said defined distributions and each of their associated imbalance corrections into a table;
(e) rotating said tool at a certain speed;
(f) measuring said vibration imbalance of said tool;
(g) choosing one of said plurality of said stored distributions by use of said measured vibration imbalance;
(h) stopping said tool; and
(i) arranging certain of said weighted objects in said chosen distribution around said tool.

10. The method of claim 9 further comprising the step of:
(i) defining each of said plurality of weighted objects to be substantially similar.

11. The method of claim 10 further comprising the step of:
(j) defining each of said plurality of weighted objects to be spheres.

* * * * *